(12) United States Patent
Tanaka et al.

(10) Patent No.: US 10,381,937 B2
(45) Date of Patent: Aug. 13, 2019

(54) POWER CONVERTER HAVING MULTIPLE SWITCHING LEGS

(71) Applicant: Hitachi Automotive Systems, Ltd., Hitachinaka-shi, Ibaraki (JP)

(72) Inventors: Shintaro Tanaka, Tokyo (JP); Tadahiko Chida, Tokyo (JP); Takae Shimada, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/539,548

(22) PCT Filed: Nov. 11, 2015

(86) PCT No.: PCT/JP2015/081676
§ 371 (c)(1),
(2) Date: Jun. 23, 2017

(87) PCT Pub. No.: WO2016/103942
PCT Pub. Date: Jun. 30, 2016

(65) Prior Publication Data
US 2017/0358995 A1    Dec. 14, 2017

(30) Foreign Application Priority Data

Dec. 25, 2014    (JP) .................................. 2014-261544

(51) Int. Cl.
*H02M 3/335*    (2006.01)
*H02M 5/42*    (2006.01)
(Continued)

(52) U.S. Cl.
CPC ........ *H02M 3/33569* (2013.01); *H01F 29/14* (2013.01); *H02M 3/285* (2013.01); *H02M 3/33584* (2013.01)

(58) Field of Classification Search
CPC ......... H02M 3/33523; H02M 3/33546; H02M 3/33569; H02M 3/33592
(Continued)

(56) References Cited

U.S. PATENT DOCUMENTS

2005/0270806 A1* 12/2005 Zhu .................... H02M 3/33576
363/17
2006/0268589 A1* 11/2006 Nakahori .............. H02M 3/285
363/132
(Continued)

FOREIGN PATENT DOCUMENTS

JP    2002-291247 A    10/2002
JP    2006-333667 A    12/2006
(Continued)

OTHER PUBLICATIONS

International Search Report (PCT/ISA/210) issued in counterpart Japanese Application No. PCT/JP2015/081676 dated Mar. 1, 2016 with English translation (five (5) pages).
(Continued)

*Primary Examiner* — Gary Nash
(74) *Attorney, Agent, or Firm* — Crowell & Moring LLP

(57) ABSTRACT

The present invention aims to provide a power converter, which includes a plurality of switching power supply devices connected in parallel, with a circuit configuration that enables reduction of cost and a size of the power converter. The present invention relates to a power converter including at least a first switching power supply device and a second switching power supply device connected in parallel. A part of high-voltage-compatible switching elements is commonly used between the first switching power supply device and the second switching power supply device, and a drive gate signal of one of the high-voltage-compatible switching elements of the first switching power supply device and the second switching power supply device and a
(Continued)

phase difference of a drive gate signal of the commonly used switching power supply device are set to be equal when a load current is a first current value or lower.

10 Claims, 29 Drawing Sheets

(51) Int. Cl.
 *H02M 7/68* (2006.01)
 *H02M 3/24* (2006.01)
 *H02M 7/44* (2006.01)
 *H02M 7/5387* (2007.01)
 *H02M 7/538* (2007.01)
 *H02M 3/28* (2006.01)
 *H01F 29/14* (2006.01)

(58) Field of Classification Search
 USPC ............ 363/16, 17, 19–21.01, 21.04, 21.06,
 363/21.09, 21.1, 97, 98, 132, 134, 136
 See application file for complete search history.

(56) References Cited

U.S. PATENT DOCUMENTS

2010/0142240 A1\* 6/2010 Lee .................... H02M 3/3378
 363/132
2010/0182814 A1\* 7/2010 Tada .................... H02J 7/0054
 363/134

FOREIGN PATENT DOCUMENTS

JP 2010-124671 A 6/2010
WO WO 2009/001854 A1 12/2008

OTHER PUBLICATIONS

Japanese-language Written Opinion (PCT/ISA/237) issued in PCT Application No. PCT/JP2015/081676 dated Mar. 1, 2016 (five (5) pages).

\* cited by examiner

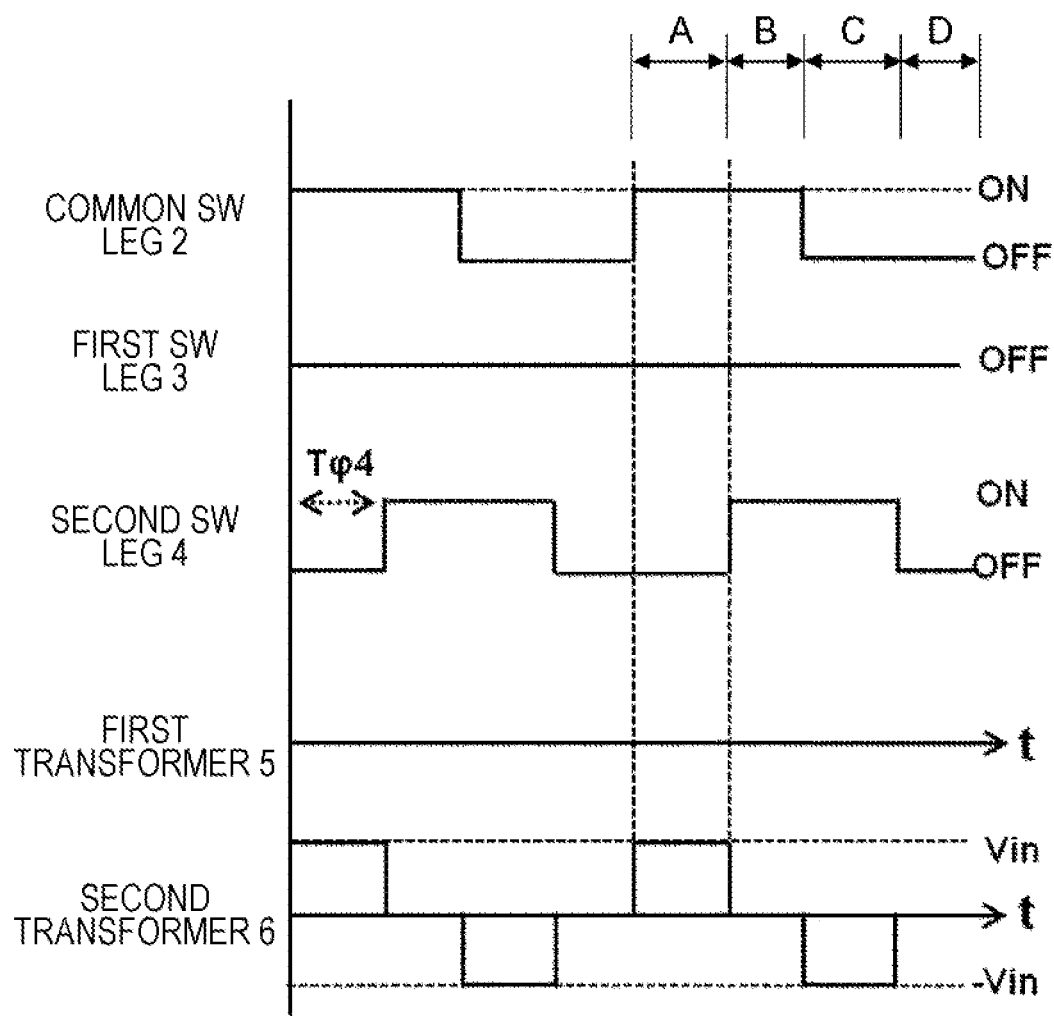

POWER CONVERTER HAVING MULTIPLE SWITCHING LEGS

TECHNICAL FIELD

The present invention relates to a power converter including a switching power supply device and a control circuit that controls the switching power supply device, and particularly to a power converter mounted to a car.

BACKGROUND ART

Recently, there has been a growing interest on cars, such as a hybrid car and an electric car, which utilize electric energy with depletion of fossil fuel and deterioration of global environmental issues as the background thereof, and such cars have been practically used. Such cars using the electric energy are often provided with a power converter that steps down a voltage from a high voltage battery, configured to supply power to a motor configured to drive a wheel, and supplies the required power to low-voltage electric equipment. In general, a switching power supply device is used in the power converter that supplies power to the electric equipment such as an air conditioner, an audio, and a controller of the car.

Here, losses such as a copper loss and a fixed loss are generated in the power converter at the time of converting the power. The copper loss generated in the switching power supply device is proportional to the square of an output current. There is a case where two switching power supply devices are provided in parallel in order to improve conversion efficiency of a power converter. When the power converter is configured to include the switching power supply devices connected in parallel, since it is possible to halve each output current of the switching power supply devices, the copper loss is reduced, which enables significant improvement of conversion efficiency of the power converter.

In addition, the losses generated in the switching power supply device generally include the fixed loss (for example, an iron loss generated as a voltage is applied to a transformer) that does not depend on a magnitude of a load current in addition to the copper loss that is proportional to the square of the output current. Since the fixed loss is generated without depending on an output current value, a proportion occupied by the fixed loss in the entire loss becomes relatively great in a state where the output current value is small. In particular, when the electric equipment, such as the air conditioner, with a large load is used in the car, a load current thereof approaches a maximum output current value of the power converter thereof. On the contrary, when the above-described electric equipment with the large load is not used, the output current value becomes extremely small. That is, the power converter is driven in any state between the state with the large load and the state with the small load in many cases. Therefore, the conversion efficiency of the power converter is low when the output current value is small, and thus, consumption of a high voltage battery increases.

In this regard, there is a technique of stopping one of a plurality of switching power supply devices connected in parallel when an output current value is small. When the output current value becomes an arbitrary value or smaller, control is performed such that one of the switching power supply devices connected in parallel is stopped. Through this control method, an operation of one of the switching power supply devices is stopped when a load is small. Thus, the fixed loss of the switching power supply device decreases, and accordingly, the conversion efficiency of the power converter in the state with the small load is improved. For example, a power converter disclosed JP 2002-291247 A (PTL 1) is known as the power converter in which the above-described control is performed.

CITATION LIST

Patent Literature

PTL 1: JP 2002-291247 A

SUMMARY OF INVENTION

Technical Problem

Meanwhile, a voltage required for a motor to drive a wheel is about 400 V, which is relatively high, in the power converter. Thus, there is a switching element that is compatible to a high voltage among the switching power supply devices connected in parallel. In general, the high-voltage-compatible switching element requires high cost, and an occupied area thereof is large.

The power converter is configured such that one of the plurality of switching power supply devices connected in parallel is stopped when each of the output current values is small, and one of the switching power supply devices connected in parallel is stopped. However, the following problem is present as the power converter in PTL 1 has the above-described configuration. That is, the number of elements to be mounted increases due to an increase in the number of elements connected in parallel in order to stop one of the switching power supply devices connected in parallel, and particularly, the number of high-voltage-compatible switching elements also increases, which increases the cost and size of the power converter.

In order to solve the above-described problem, an object of the present invention is to provide a circuit configuration which enables reduction of cost and a size of a power converter in the power converter including a plurality of switching power supply devices connected in parallel, a noble power converter with the circuit configuration in which conversion efficiency in a small load state is improved, and a car provided with the power converter.

Solution to Problem

A power converter according to the present invention includes: a common switching leg that is connected to one end of a primary side of a first transformer and is connected to one end of a second transformer; a first switching leg that is connected to another end of the primary side of the first transformer; a second switching leg that is connected to another end of a primary side of the second transformer; a first secondary circuit that is connected to a secondary side of the first transformer; and a second secondary circuit that is connected to a secondary side of the second transformer. The common switching leg, the first switching leg, and the second switching leg are electrically connected, in parallel, to an input terminal. The first secondary circuit and the second secondary circuit are electrically connected, in parallel, to the output terminal. Preferably, when a phase difference between a switching control signal of the common switching leg and a switching control signal of the first switching leg is set to T1, and a phase difference between a switching control signal of the common switching leg and a switching control signal of the second switching leg is set to T2, any one of the phase difference T1 and the phase difference T2 is controlled to be zero in a case where a current flowing in the output terminal is smaller than a predetermined current value.

Advantageous Effects of Invention

According to the present invention, it is possible to reduce the cost and size of the power converter by commonly using a part of the high-voltage-compatible switching elements of the first switching power supply device and the second switching power supply device. Further, the application voltage to one of the transformers of the switching power supply devices connected in parallel becomes zero since a drive gate signal of one of high-voltage-compatible switching elements and a drive gate signal of the commonly used switching power supply device are set to be equal in a light load state, and an iron loss of the one transformer becomes zero, thereby improving the conversion efficiency in the light load state.

BRIEF DESCRIPTION OF DRAWINGS

FIG. 13 is gate signal waveforms and transformer application voltage waveforms when open circuit failure occurs in a first switching leg 3 according to the fourth embodiment.

DESCRIPTION OF EMBODIMENTS

Hereinafter, embodiments of the present invention will be described in detail with reference to the accompanying drawings, but the present invention is not limited to the following embodiments, and various modifications and applications that fall within the technological concept of the present invention will be also included in the scope of the present invention.

First Embodiment

Figure 1:
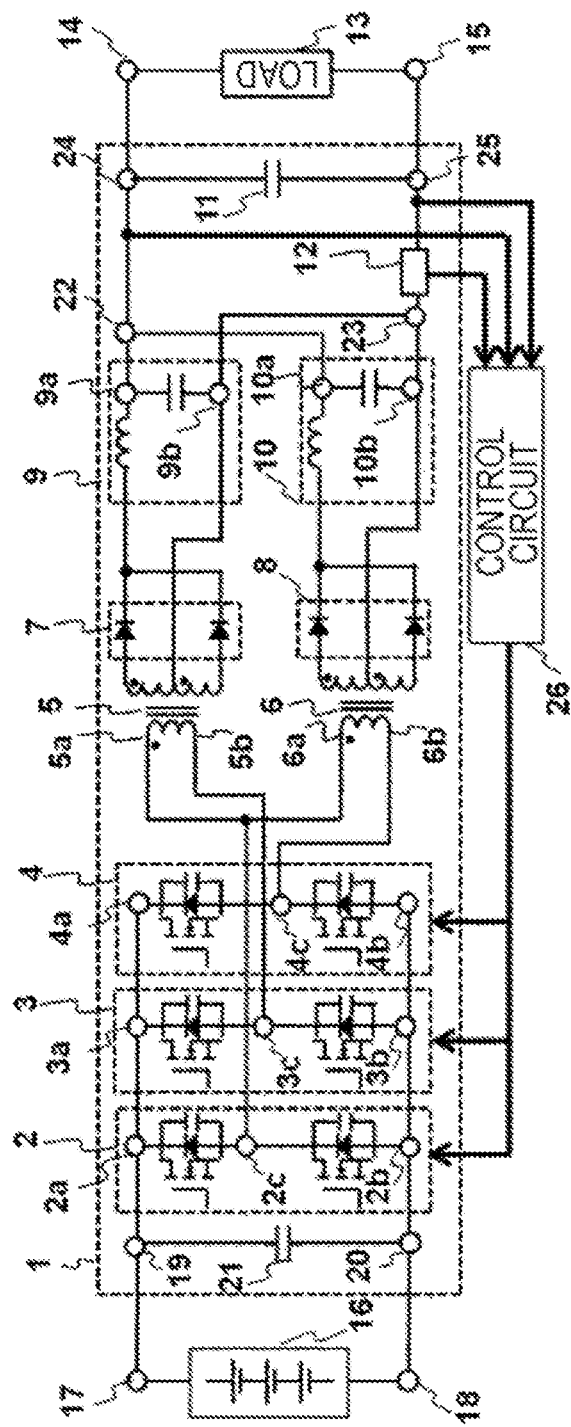
FIG. 1 is a diagram illustrating a configuration of a power converter according to a first embodiment.

FIG. 1 is a configuration diagram of a power converter according to a first embodiment. The power converter according to the present embodiment is configured using a switching power supply device 1. An input terminal 19 of the switching power supply device 1 is connected to a positive electrode 17 of a high voltage battery 16. An input terminal 20 of the switching power supply device 1 is connected to a negative electrode 18 of the high voltage battery 16.

An input capacitor 21 is connected to the input terminals 19 and 20.

One terminal 2a of a common switching leg 2, one terminal 3a of a first switching leg 3, and one terminal 4a of a second switching leg 4 are connected, in parallel, to the input terminal 19 of the switching power supply device 1. The other terminal 2b of the common switching leg 2, the other terminal 3b of the first switching leg 3, and the other terminal 4b of the second switching leg 4 are connected, in parallel, to the input terminal 20 of the switching power supply device 1.

Each of the common switching leg 2, the first switching leg 3, and the second switching leg 4 includes the MOSFET's connected in series. Incidentally, the MOSFET is used in the present embodiment, but a switching element such as an IGBT may be used.

A midpoint 2c of the common switching leg 2 is connected to one terminal 5a of a primary winding of a first transformer 5 and one terminal 6a of a primary winding of a second transformer 6. A midpoint 3c of the first switching leg 3 is connected to the other terminal 5b of the primary winding of the first transformer 5. A midpoint 4c of the second switching leg 4 is connected to the other terminal 6b of the primary winding of the second transformer 6.

The first transformer 5 is connected to a rectifier circuit 7 including a diode. The rectifier circuit 7 is connected to a smoothing circuit 9 including a choke coil and a smoothing capacitor. One terminal 9a of the smoothing circuit 9 is connected to a connection terminal 22. The other terminal 9b of the smoothing circuit 9 is connected to a connection terminal 23. The second transformer 6 is connected to a rectifier circuit 8 including a diode. The rectifier circuit 8 is connected to a smoothing circuit 10 including a choke coil and a smoothing capacitor. One terminal 10a of the smoothing circuit 10 is connected to the connection terminal 22. The other terminal 10b of the smoothing circuit 10 is connected to the connection terminal 23.

An output capacitor 11 is connected to output terminals 24 and 25. The connection terminal 22 and the output terminal 24 are connected to each other in the switching power supply device 1. A current detector 12 that detects an output current is connected between the connection terminal 23 and the output terminal 25. One terminal 14 of a load 13 is connected to the output terminal 24. The other terminal 15 of the load 13 is connected to the output terminal 25.

The switching power supply device 1 is provided with a control circuit 26. The control circuit 26 controls operations of the common switching leg 2, the first switching leg 3, and the second switching leg 4.

In the present embodiment described with reference to FIG. 1, the first transformer 5 and the second transformer 6 employ a center tap system, but may use a current doubler system or other systems. In addition, the rectifier circuits 7 and 8 use diode rectification, but may use other rectification systems such as a synchronous rectification system using a MOSFET. In addition, the connection terminal 22 and the output terminal 24 are connected to each other, and the current detector 12 that detects the output current is connected between the connection terminal 23 and the output terminal 25 in the switching power supply device 1. However, the connection terminal 23 and the output terminal 25 may be connected to each other, and the current detector 12 that detects the output current may be connected between the connection terminal 22 and the output terminal 24. In addition, the number of turns may differ between the first transformer 5 and the second transformer 6 if turn ratios thereof are equal to each other.

The control circuit 26 monitors an output voltage of the output capacitor 11 and the output current detected by the current detector 12. The control circuit 26 controls the operations of the common switching leg 2, the first switching leg 3, and the second switching leg 4 of the switching power supply device 1 such that the output voltage becomes a predetermined value, based on the detected output current. Herein, an (input) voltage between the input terminals 19 and 20 of the switching power supply device 1 is defined as Vin, an (output) voltage between the output terminals 24 and 25 is defined as Vo, the output current detected by the current detector 12 is defined as Io, and a maximum value of the output current is defined as Iomax.

There are two modes in the switching power supply device 1. A first mode is a heavy load mode in which a load is large. Another mode is a light load mode in which a load is small. Herein, a current value that changes a control operation mode is denoted by Ic. A condition of Ic is that a value of Ic is smaller than Iomax (Ic<Iomax). A method of determining the value of Ic can be arbitrarily set, such as a method of determining an output current value which enables the conversion efficiency of the switching power supply device 1 to be equal between the heavy load mode and the light load mode. Hereinafter, details of the heavy load mode and the light load mode will be described. Incidentally, a case where a potential of the input terminal 20 is zero is described hereinafter. When the potential of the input terminal 20 is not zero, the potential of the input terminal 20 is added to each potential.

In a state where Io is larger than Ic, and Io is smaller than Iomax (Ic<Io<Iomax), control is executed in in the heavy load mode to be described later.

Figure 2:
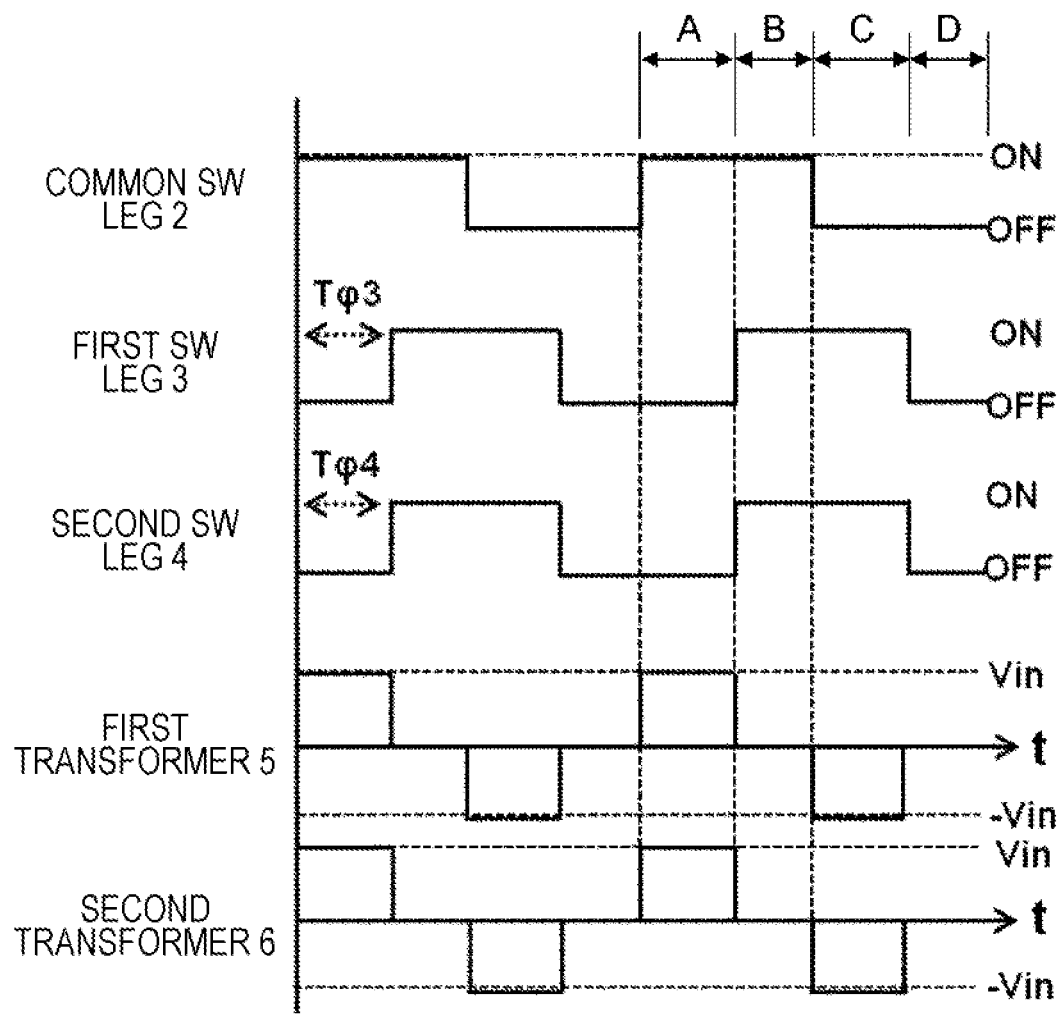
FIG. 2 is gate signal waveforms and transformer application voltage waveforms in a heavy load mode of according to first embodiment.

FIG. 2 is a graph illustrating gate signal waveforms and transformer application voltages in the heavy load mode. The gate signal waveform of FIG. 2 represents a gate voltage which is applied to a switching element connected to the input terminal 19 of the switching power supply device 1 among the switching elements forming the respective switching legs. Incidentally, a gate signal waveform applied to a switching element connected to the input terminal 20 becomes a waveform obtained by inverting the gate signal illustrated in FIG. 2. Hereinafter, the same description is applied in the other embodiments unless otherwise noted particularly.

The control circuit 26 monitors an output voltage of the output capacitor 11 and the output current detected by the current detector 12. In the heavy load mode, a time Tφ3 at which a gate signal of the first switching leg 3 is turned on and a time Tφ4 at which a gate signal of the second switching leg 4 is turned on are controlled based on a time at which a gate signal of the common switching leg 2 of the switching power supply device 1 is turned on such that the output voltage becomes the predetermined value. An application time of the input voltage to the first transformer 5 is controlled by controlling the time $T\varphi3$. In addition, an application time of the input voltage to the second transformer 6 is controlled by controlling $T\varphi4$. At this time, when a switching period of the common switching leg 2, the first switching leg 3, and the second switching leg 4 is denoted by T, an application voltage VT5 to the first transformer 5 is expressed by the following Formula (1), and an application voltage VT6 to the second transformer 6 is expressed by Formula (2).

[Formula 1]

$$V_{T5} = V_{in} \times 2T_{\varphi3}/T \quad (1)$$

[Formula 2]

$$V_{T6} = V_{in} \times 2T_{\varphi4}/T \quad (2)$$

The operation in the heavy load mode will be described with reference to FIGS. 3(a) to 3(d). Each of FIGS. 3(a) to 3(d) illustrates a current flowing in a circuit on the high voltage battery side corresponding to an operation pattern of each of periods A to D in FIG. 2.

Figure 3A:
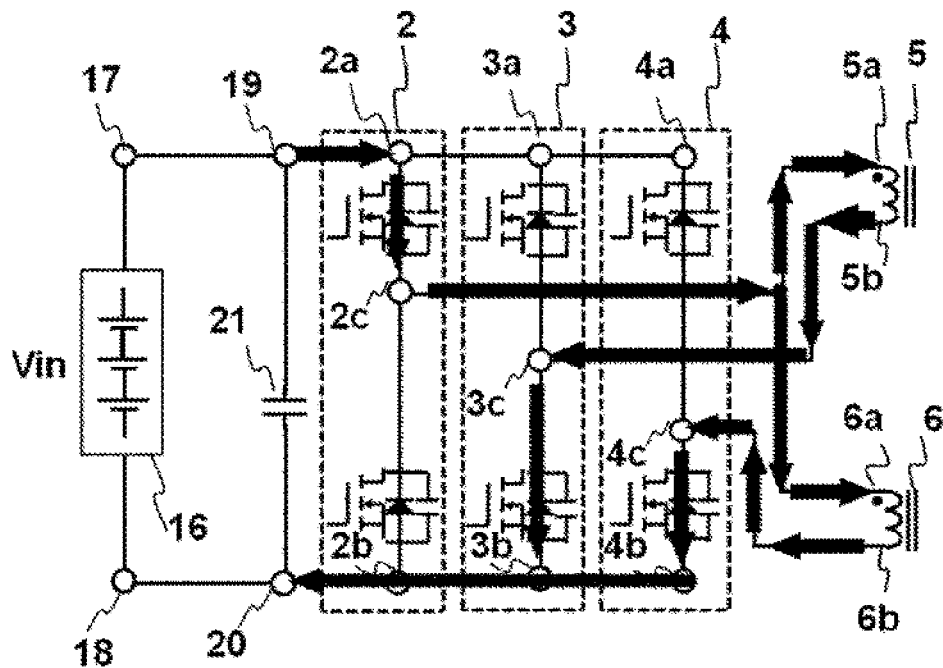
FIG. 3A is a circuit diagram on a high voltage battery side of a switching power supply device in a period A of FIG. 2.

FIG. 3(a) illustrates a circuit diagram on the high voltage battery side of the switching power supply device 1 in a state of the period A of FIG. 2. In the period A of FIG. 2, the gate signal of the common switching leg 2 is turned on, the gate signal of the first switching leg 3 is turned off, and the gate signal of the second switching leg 4 is turned off. Thus, a potential of the midpoint 2c of the common switching leg 2 is Vin, a potential of the midpoint 3c of the first switching leg 3 is zero, and a potential of the midpoint 4c of the second switching leg 4 is zero. Therefore, the application voltage VT5 to the first transformer 5 becomes Vin, and the application voltage VT6 to the second transformer 6 becomes Vin.

At this time, a current flowing from the input terminal 19 to the common switching leg 2 flows from the midpoint 2c of the common switching leg to the first transformer 5 and the second transformer 6. The current flowing in the first transformer 5 flows from the midpoint 3c of the first switching leg 3 to the input terminal 20. The current flowing in the first transformer 6 flows from the midpoint 4c of the second switching leg 4 to the input terminal 20.

Figure 3B:
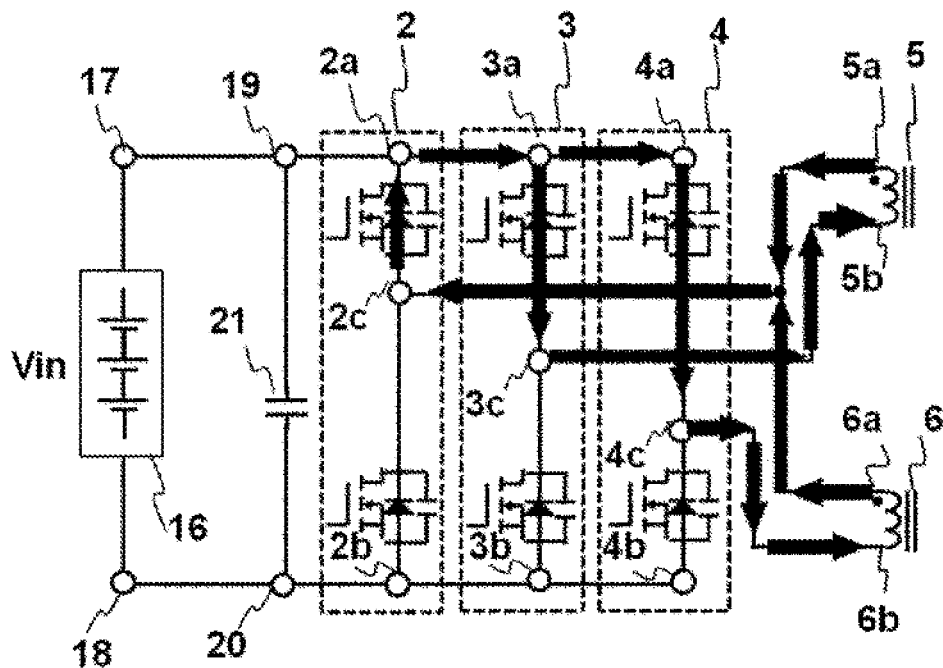
FIG. 3B is a circuit diagram on the high voltage battery side of the switching power supply device in a period B of FIG. 2.

FIG. 3(b) illustrates a circuit diagram on the high voltage battery side of the switching power supply device 1 in a state of the period B of FIG. 2. In the period B of FIG. 2, the application voltage VT5 to the first transformer 5 becomes zero, and the application voltage VT6 to the second transformer 6 becomes zero.

First, the current flows from the midpoint 2c of the common switching leg to the first transformer 5 and the second transformer 6. The current flowing in the first transformer 5 flows from the midpoint 3c of the first switching leg 3 to the one terminal 2a of the common switching leg 2. The current flowing in the second transformer 6 flows from the midpoint 4c of the second switching leg 4 to the one terminal 2a of the common switching leg 2. Thereafter, an orientation of a current path is reversed due to a leakage inductance of the first transformer 5 and a leakage inductance of the second transformer 6 as illustrated in FIG. 3(b).

Figure 3C:
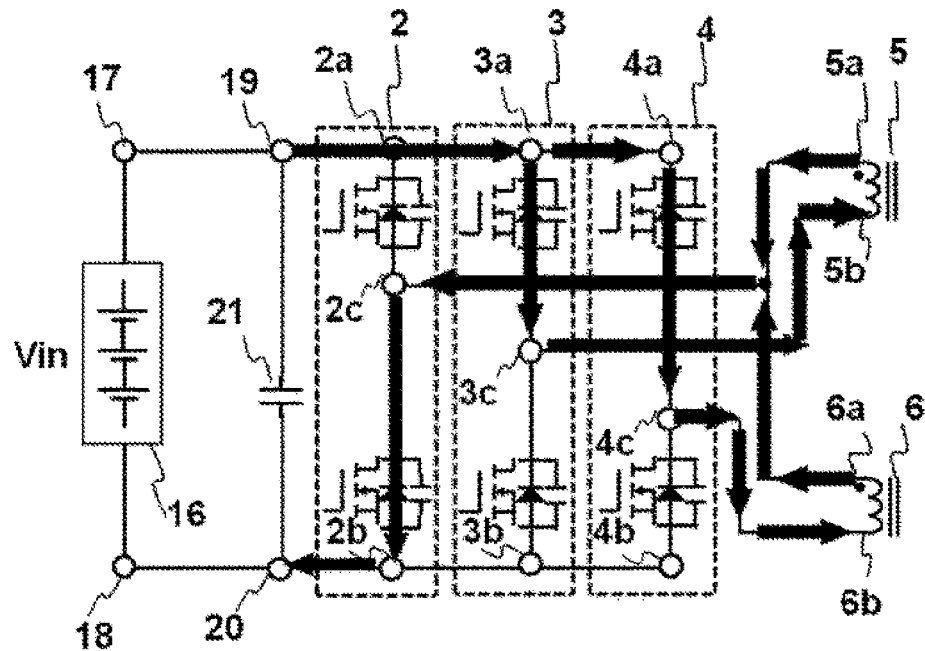
FIG. 3C is a circuit diagram on the high voltage battery side of the switching power supply device in a period C of FIG. 2.

FIG. 3(c) illustrates a circuit diagram on the high voltage battery side of the switching power supply device 1 in a state of the period C of FIG. 2. In the period C of FIG. 2, the application voltage VT5 to the first transformer 5 becomes Vin, and the application voltage VT6 to the second transformer 6 becomes Vin.

At this time, the current flowing from the input terminal 19 flows to the first switching leg 3 and the second switching leg 4. The current flows from the midpoint 3c of the first switching leg 3 to the midpoint 2c of the common switching leg 2 via the first transformer 5. In addition, the current flows from the midpoint 4c of the second switching leg 4 to the midpoint 2c of the common switching leg 2 via the second transformer 6.

Figure 3D:
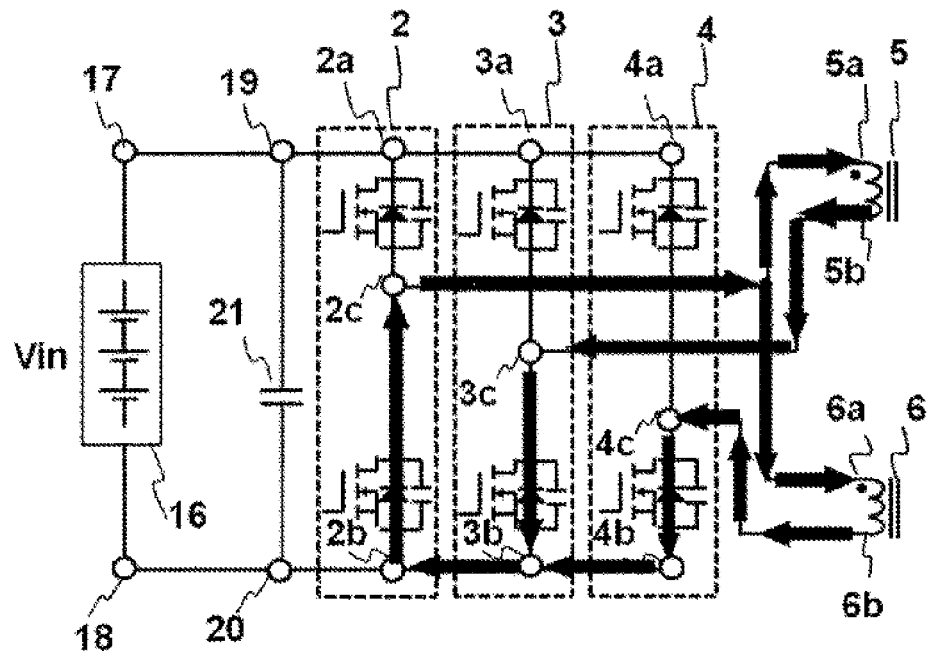
FIG. 3D is a circuit diagram on the high voltage battery side of the switching power supply device in a period D of FIG. 2.

FIG. 3(d) illustrates a circuit diagram on the high voltage battery side of the switching power supply device 1 in a state of the period D of FIG. 2. In the period D of FIG. 2, the application voltage VT5 to the first transformer 5 becomes zero, and the application voltage VT6 to the second transformer 6 becomes zero.

First, the current flows from the other terminal 2b of the common switching leg 2 to the first switching leg 3 and the second switching leg 4. The current from the midpoint 3c of the first switching leg 3 flows to the first transformer 5. The current from the midpoint 4c of the second switching leg 4 flows to the second transformer 6. The current flowing through the first transformer 5 and the second transformer 6 flows to the midpoint 2c of the common switching leg 2. Thereafter, the orientation of the current path is reversed as illustrated in FIG. 3(d).

In a state where Io is smaller than Ic, and Io is larger than zero (0<Io<Ic), control is executed in the light load mode to be described later.

Figure 4:
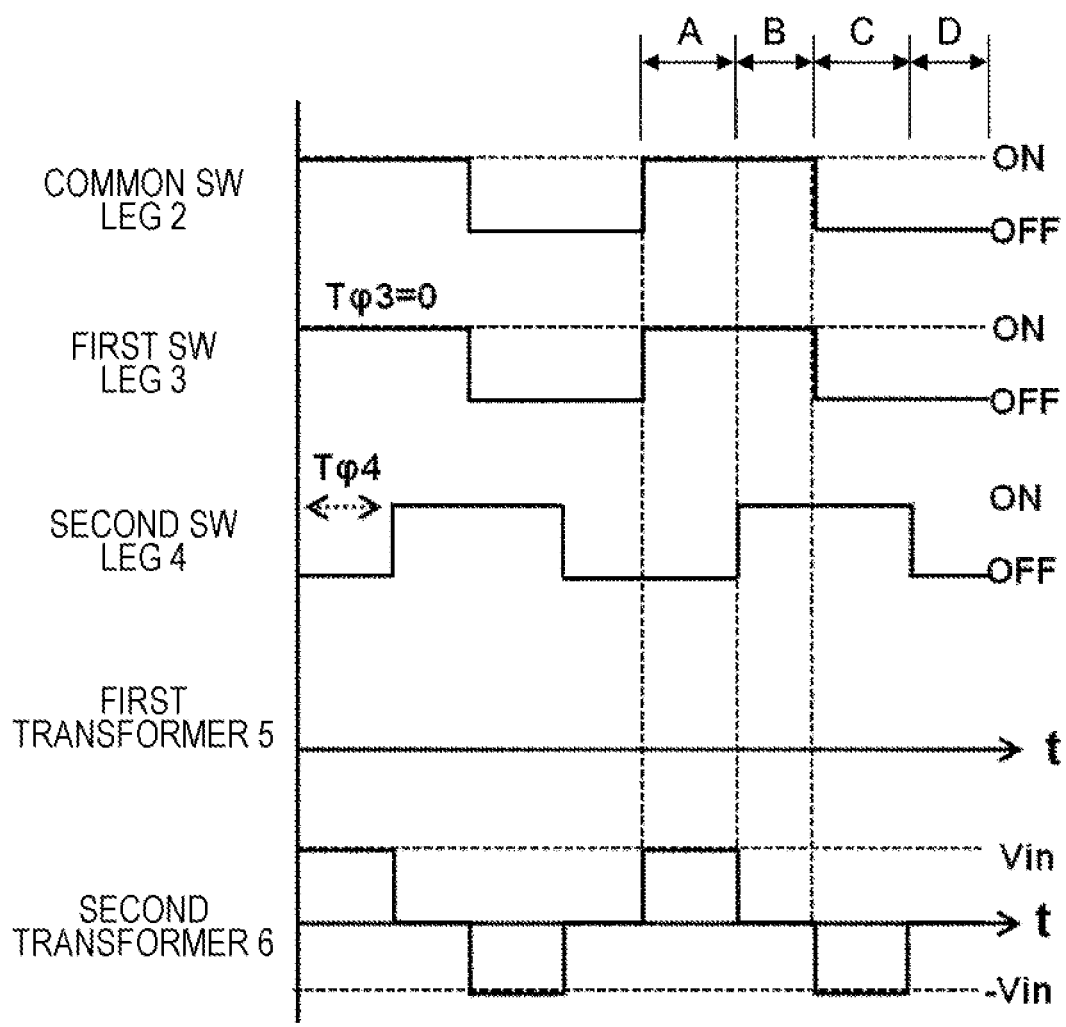
FIG. 4 is gate signal waveforms and transformer application voltage waveforms in a light load mode according to the first embodiment.
Figure 5A:
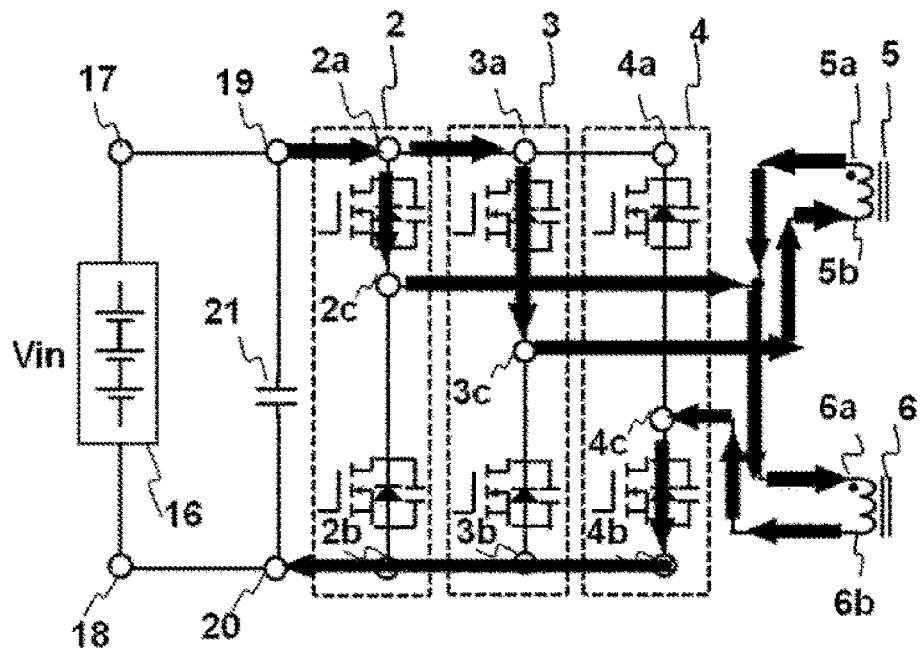
FIG. 5A is a circuit diagram on the high voltage battery side of the switching power supply device in a period A of FIG. 4.
Figure 5B:
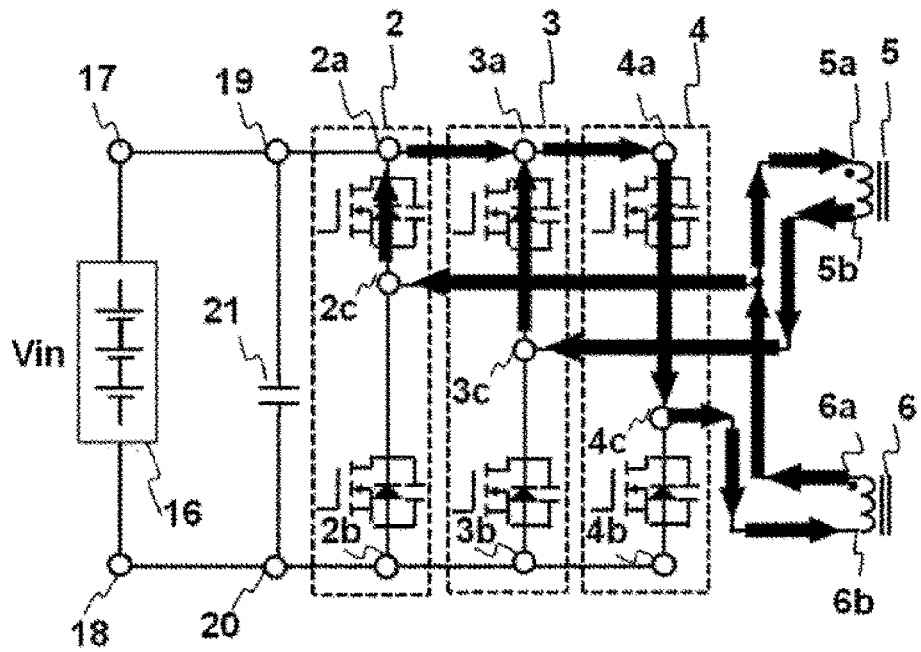
FIG. 5B is a circuit diagram on the high voltage battery side of the switching power supply device in a period B of FIG. 4.
Figure 5C:
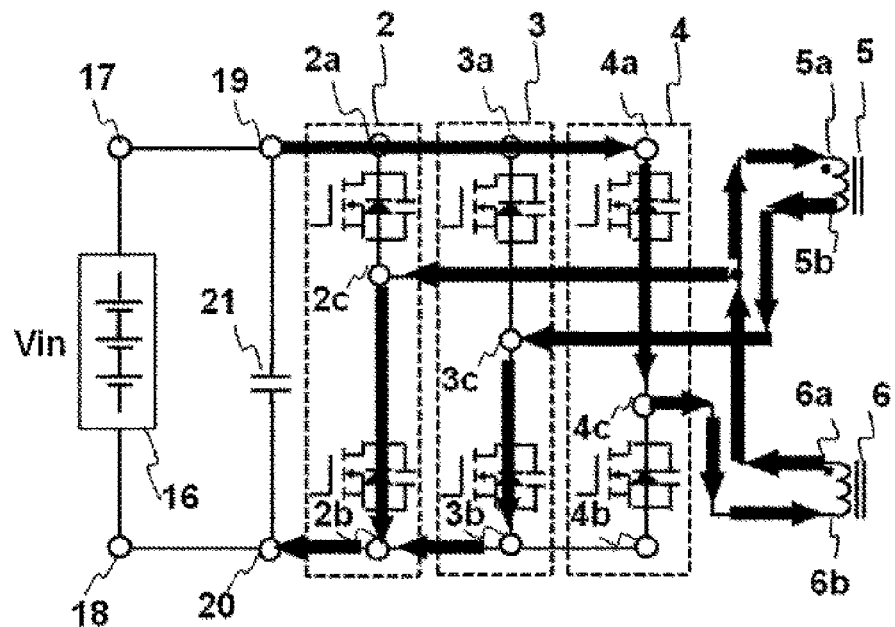
FIG. 5C is a circuit diagram on the high voltage battery side of the switching power supply device in a period C of FIG. 4.
Figure 5D:
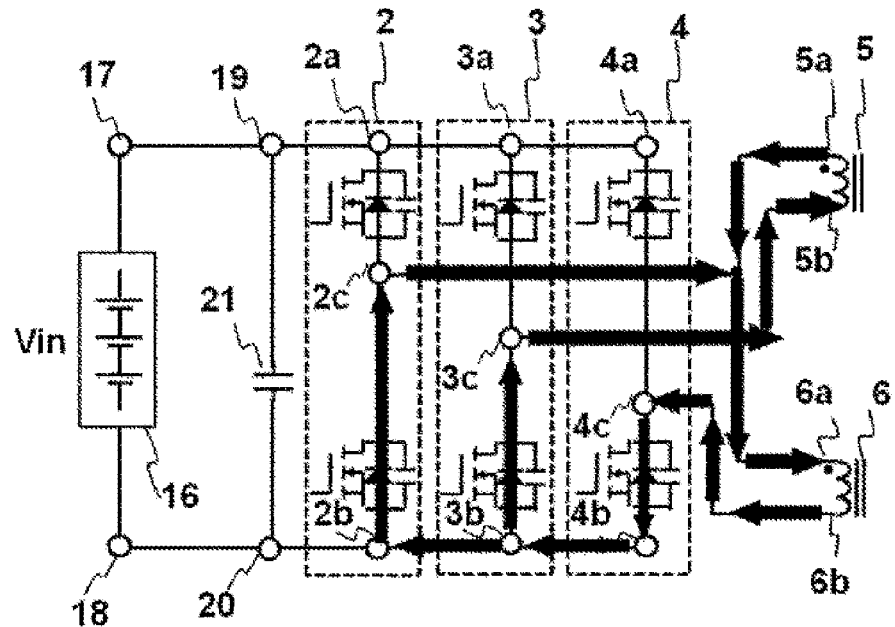
FIG. 5D is a circuit diagram on the high voltage battery side of the switching power supply device in a period D of FIG. 4.

FIG. 4 is a graph illustrating gate signal waveforms and transformer application voltages in the light load mode. Similarly to FIG. 2, the gate signal waveform of FIG. 4 represents the gate voltage which is applied to the switching element connected to the input terminal 19 of the switching power supply device 1 among the switching elements forming the respective switching legs.

In the light load mode, the control circuit 26 sets the time $T\varphi3$ at which the gate signal of the first switching leg 3 is turned on to zero based on the time at which the gate signal of the common switching leg 2 of the switching power supply device 1 is turned on. In addition, the time $T\varphi4$ at which the gate signal of the second switching leg 4 is turned on is controlled based on the time at which the gate signal of the common switching leg 2 of the switching power supply device 1 is turned on such that the output voltage becomes the predetermined value. Since $T\varphi3$ is zero, the application tint of the input voltage to the first transformer 5 is zero. In addition, the application time of the input voltage to the second transformer 6 is controlled by controlling $T\varphi4$. At this time, when the switching period of the common switching leg 2, the first switching leg 3, and the second switching leg 4 is denoted by T, the application voltage VT5 to the first transformer 5 is expressed by the following Formula (3), and the application voltage VT6 to the second transformer 6 is expressed by Formula (4).

[Formula 3]

$$V_{T5} = 0 \quad (3)$$

[Formula 4]

$$V_{T6} = V_{in} \times 2T_{\varphi4}/T \quad (4)$$

The operation in the light load mode will be described with reference to FIGS. 5(a) to 5(d). Each of FIGS. 5(a) to 5(*d*) illustrates a current flowing in a circuit on the high voltage battery side corresponding to an operation pattern of each of periods A to D in FIG. 4.

FIG. 5(*a*) illustrates a circuit diagram on the high voltage battery side of the switching power supply device 1 in a state of the period A of FIG. 4. In the period A of FIG. 4, the gate signal of the common switching leg 2 is turned on, the gate signal of the first switching leg 3 is turned on, and the gate signal of the second switching leg 4 is turned off. Thus, a potential of the midpoint 2C of the common switching leg 2 is Vin, a potential of the midpoint 3*c* of the first switching leg 3 is Vin, and a potential of the midpoint 4*c* of the second switching leg 4 is zero. Therefore, the application voltage VT5 to the first transformer 5 becomes zero, and the application voltage VT6 to the second transformer 6 becomes Vin.

At this time, a current flows from the input terminal 19 to the common switching leg 2 and the first switching leg 3. The current flowing in the common switching leg 2 flows from the midpoint 2*c* of a common switching current 2 to the second transformer 6. The current flowing in the first switching leg 3 flows from the midpoint 3*c* of the first switching leg 3 to the second transformer 6 via the first transformer 5. The current flowing in the second transformer flows to the input terminal 20 passing through a switching element on the input terminal 20 side of the second switching leg.

FIG. 5(*b*) illustrates a circuit diagram on the high voltage battery side of the switching power supply device 1 in a state of the period B of FIG. 4. In the period B of FIG. 2, the application voltage VT5 to the first transformer 5 becomes zero, and the application voltage VT6 to the second transformer 6 becomes zero.

First, the current flows from the one terminal 4*a* of the second switching leg to the common switching leg 2 and the first switching leg 3. The current flowing in the common switching leg 2 flows from the midpoint 2*c* of a common switching current 2 to the second transformer 6. The current flowing in the first switching leg 3 flows from the midpoint 3*c* of the first switching leg 3 to the second transformer 6 via the first transformer 5. The current flowing in the second transformer flows to the one terminal 2*a* of the common switching leg 2 and the one terminal 3*a* of the first switching leg passing through a switching element on the input terminal 19 side of the second switching leg. Thereafter, an orientation of a current path is reversed as illustrated in FIG. 5(*b*).

FIG. 5(*c*) illustrates a circuit diagram on the high voltage battery side of the switching power supply device 1 in a state of the period C of FIG. 4. In the period C of FIG. 4, the application voltage VT5 to the first transformer 5 becomes zero, and the application voltage VT6 to the second transformer 6 becomes Vin.

At this time, the current flowing from the second switching leg 4 to the second transformer 6 flows to the midpoint 2*c* of the common switching leg 2. In addition, the current flowing from the second switching leg 4 to the second transformer 6 flows to the midpoint 3*c* of the first switching leg via the first transformer 5. Further, the current flows to the input terminal 20 via switching elements of the common switching leg 2 and the first switching leg 3 on the input terminal 20 side.

FIG. 5(*d*) illustrates a circuit diagram on the high voltage battery side of the switching power supply device 1 in a state of the period D of FIG. 4. In the period D of FIG. 4, the application voltage VT5 to the first transformer 5 becomes zero, and the application voltage VT6 to the second transformer 6 becomes zero.

First, the current flowing in the switching elements of the common switching leg 2 and the first switching leg 3 on the input terminal 20 side flows to the other terminal 4*b* of the second switching leg 4. The current flows from the midpoint 4*c* of the second switching leg 4 to the second transformer 6. The current flowing in the second transformer 6 flows to the midpoint 2*c* of the common switching leg 2, and further, flows to the midpoint 3*c* of the first switching leg 3 via the first transformer 5. Thereafter, the orientation of the current path is reversed as illustrated in FIG. 5(*d*).

Incidentally, the time Tφ3 at which the gate signal of the first switching leg 3 is turned on is set to zero based on the time at which the gate signal of the common switching leg 2 of the switching power supply device 1 is turned on in the above-described present embodiment. However, any switching leg may be set to zero, and the time Tφ4 at which the gate signal of the second switching leg 4 is turned on may be set to zero. In addition, an order of setting a phase difference to zero may be indefinite. For example, the first switching leg 3 may be constantly set as a switching leg for which the phase difference is set to zero, or switching legs for which the phase difference is set to zero may be alternated.

According to the power converter according to the present embodiment, the input voltage is applied to the first transformer 5 and the second transformer 6 in the heavy load mode (Ic<Io<Iomax) by providing the common switching leg 1 and controlling the phase difference between the gate signal of the common switching leg 2 and the gate signal of the first switching leg 3, and the phase difference between the gate signal of the common switching leg 2 and the gate signal of the second switching leg 4, and it is possible to reduce a copper loss of the switching power supply device 1 through the parallel operation. In addition, the application voltage to the first transformer 5 becomes zero in the light load mode (0<Io<Ic) so that it is possible to reduce a fixed loss of the switching power supply device 1. That is, it is possible to improve the conversion efficiency in the entire load region of the switching power supply device 1. Further, it is possible to reduce the number of switching elements by providing the common switching leg 1, it is possible to reduce a size and cost of the switching power supply device.

Figure 6:
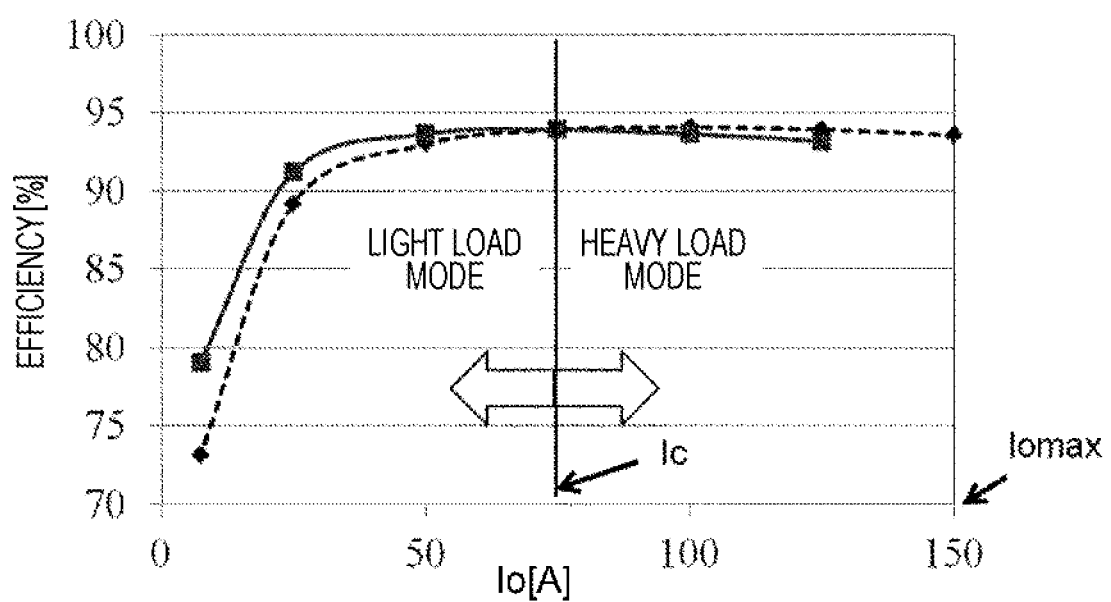
FIG. 6 is a relationship diagram illustrating an output current Io of and conversion efficiency of the power converter according to the first embodiment.

FIG. 6 is a relationship diagram between the output current Io of and conversion efficiency of the power converter according to the present embodiment when the input voltage Vin is set to 400 V, the output voltage Vo is set to 14 V, and Iomax is set to 150 A. In the drawing, the conversion efficiency in the light load mode is indicated by a broken line, and the conversion efficiency in the heavy load mode is indicated by a solid line. Herein, Ic is set to 75 A as an output current value which enables the conversion efficiency in the heavy load mode and the conversion efficiency in the light load mode to be equal. In a region where the output current value Io becomes 75 A<Io<150 A, the switching power supply devices 1 connected in parallel are driven under the heavy load mode so as to maintain high efficiency. In addition, in a region where the output current value Io becomes 0 A<Io<75 A, an application voltage to one transformer is set to zero under the light load mode so that that an iron loss of the transformer becomes zero and obtains higher efficiency than that in the heavy load mode.

Second Embodiment

Figure 7:
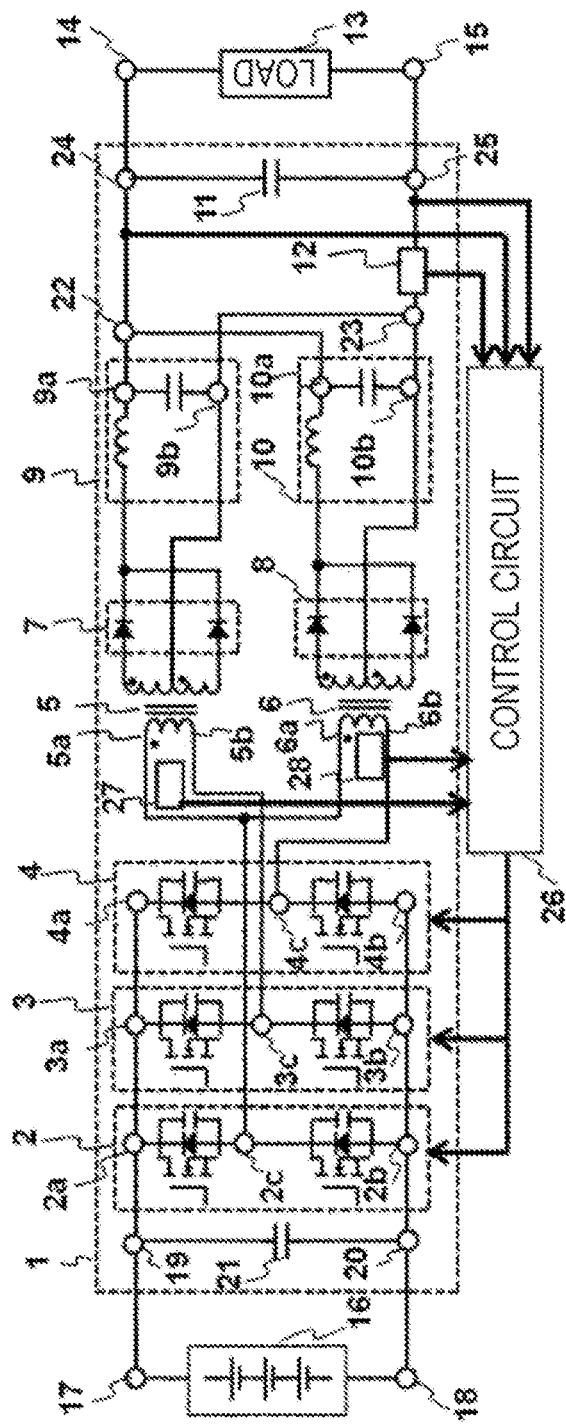
FIG. 7 is a diagram illustrating a configuration of a power converter according to a second embodiment.

FIG. 7 is a configuration diagram of a power converter according to a second embodiment. The power converter according to the present embodiment is the same as that according to the first embodiment except for added elements. The added elements are a temperature detector 27 that detects temperature of the first transformer 5 and a temperature detector 28 that detects temperature of the second transformer 6. The control circuit 26 monitors values of the temperature detectors 27 and 28. The other configuration will not be described.

When the heavy load mode is shifted to the light load mode in the present embodiment, a switching leg to set a phase difference from the common switching leg 2 to zero is determined depending on each temperature detected by the temperature detectors 27 and 28. The temperature detected by the temperature detector 27 is denoted by T1, and the temperature detected by the temperature detector 28 is denoted by T2.

Figure 8:
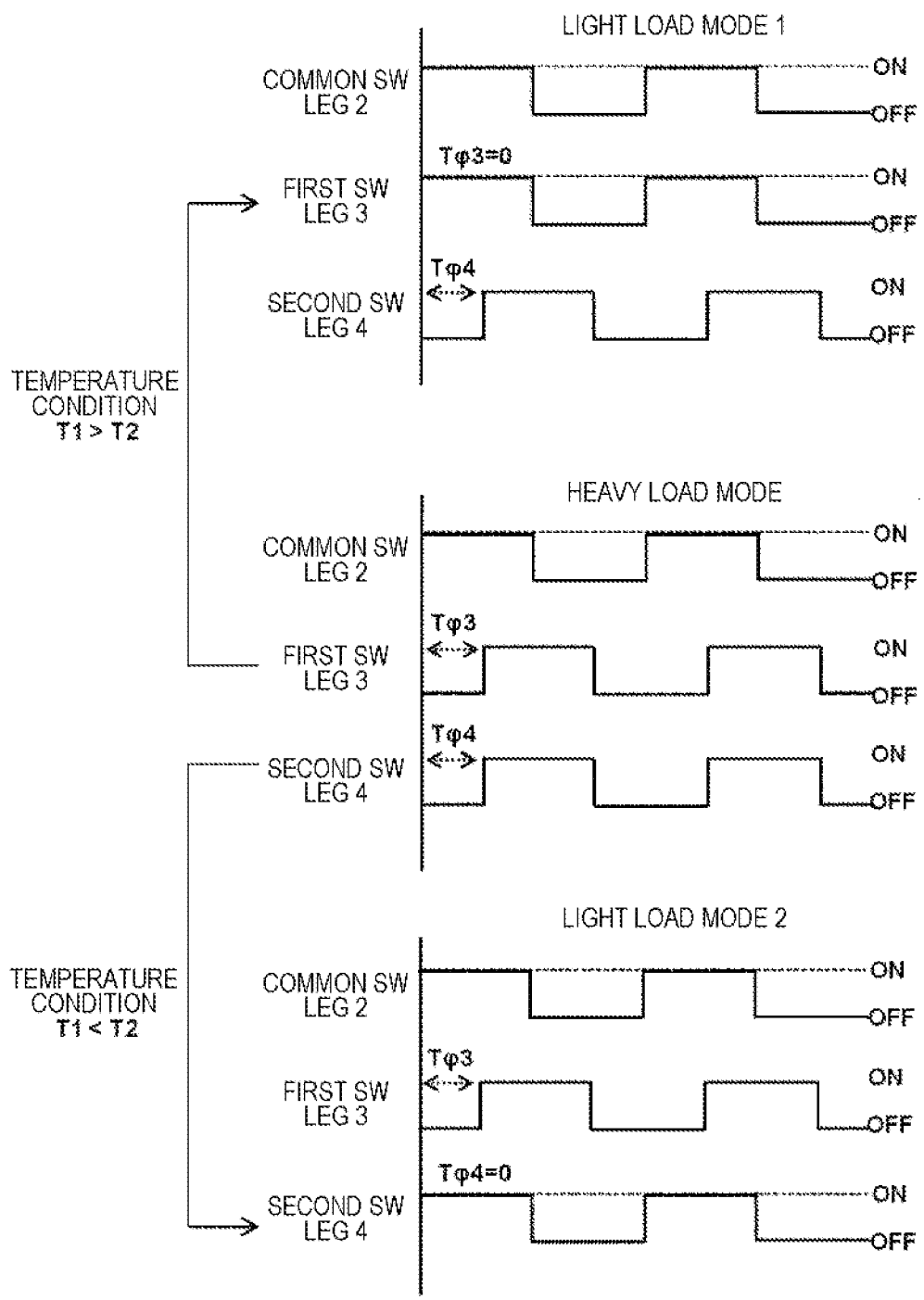
FIG. 8 is graphs of gate signal waveforms in a heavy load mode and light load modes according to the second embodiment.

FIG. 8 is a graph illustrating temperature conditions when the heavy load mode is shifted to the light load mode and gate signal waveforms of the common switching leg 2, the first switching leg 3, and the second switching leg 4 in the light load mode.

When the temperature T1 detected by the temperature detector 27 is higher than the temperature T2 detected by the temperature detector 28 (T1>T2), a light load mode 1 is set such that an application voltage to the first transformer 5 becomes zero. That is, a phase difference between a gate signal of the common switching leg 2 and a gate signal of the first switching leg 3 is set to zero.

On the other hand, when the temperature T1 detected by the temperature detector 27 is lower than the temperature T2 detected by the temperature detector 28 (T1<T2), a light load mode 2 is set such that an application voltage to the second transformer 6 becomes zero. That is, a phase difference between the gate signal of the common switching leg 2 and a gate signal of the second switching leg 4 is set to zero.

Incidentally, the temperature conditions may be reversed. The light load mode 1 may be set when the temperature T1 detected by the temperature detector 27 is lower than the temperature T2 detected by the temperature detector 28 (T1<T2), and the light load mode 2 may be set when the temperature T1 detected by the temperature detector 27 is higher than the temperature T2 detected by the temperature detector 28 (T1>T2).

Incidentally, the temperature detection of the first transformer 5 and the second transformer 6 is performed and selection of the switching leg is performed by switching the operation mode in the above-described present embodiment. However, elements other than the transformers may be subjected to the temperature detection. For example, each temperature of the first switching leg 3 and the second switching leg 4 may be detected. In addition, each temperature of the rectifier circuits 7 and 8 may be detected. In addition, each temperature of the smoothing circuits 9 and 10 may be detected.

According to the power converter according to the present embodiment, the temperature T1 of the first transformer 5 and the temperature T2 of the second transformer 6 are detected by the temperature detectors 27 and 28, and it is possible to select the switching leg that makes the phase difference from the gate signal of the common switching leg 2 zero depending on the magnitude of each detected temperature. That is, it is possible to stop the transformer, the rectifier circuit, or the smoothing circuit under harsh temperature environment in the light load mode, and thus, it is possible to mitigate the temperature environment of the element, and to increase the service life of the element of the switching power supply device 1. That is, it is possible to enhance the reliability of the switching power supply device 1.

Third Embodiment

Figure 9:
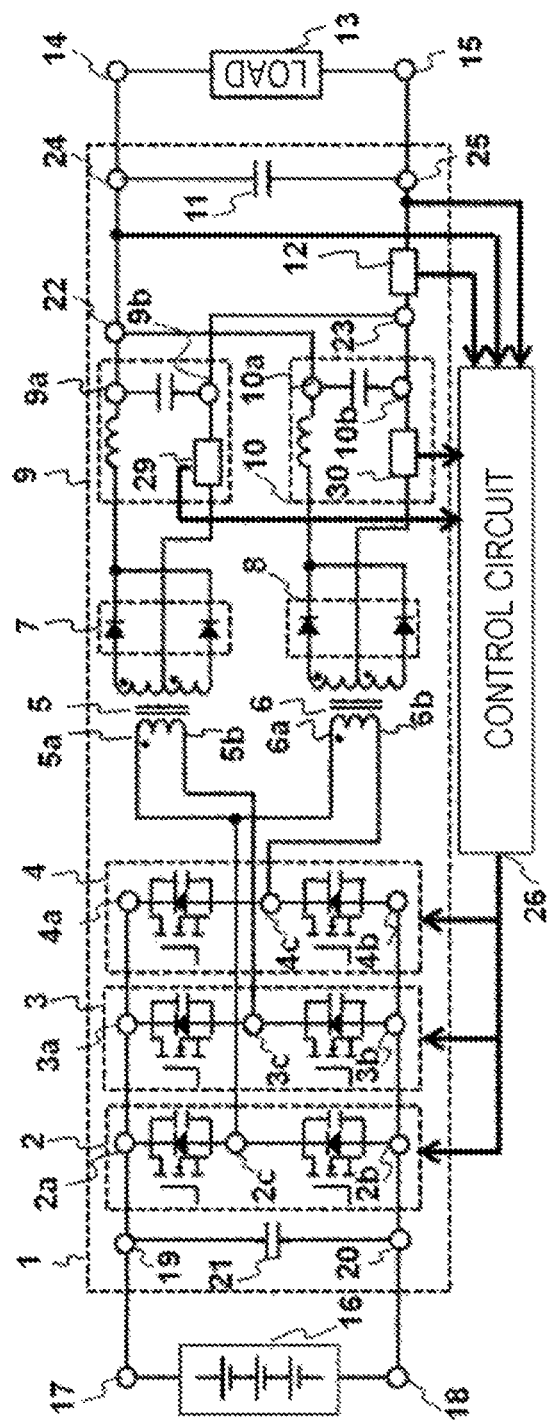
FIG. 9 is a diagram illustrating a configuration of a power converter according to a third embodiment.

FIG. 9 is a configuration diagram of a power converter according to a third embodiment. The power converter according to the present embodiment is the same as that according to the first embodiment except for added elements. The added elements are a current detector 29 that detects a current flowing to the smoothing circuit 9 and a current detector 30 that detects a current flowing to the smoothing circuit 10. The control circuit 26 monitors values of the current detectors 29 and 30. The other configuration will not be described.

Herein, the amount of a current flowing to the smoothing circuit 9 is denoted by I1, and the amount of a current flowing to the smoothing circuit 10 is denoted by I2. The total of I1 and I2 becomes the output current Io (I1+I2=Io). The control circuit 26 according to the present embodiment controls a phase difference between a gate signal of the common switching leg 2 and a gate signal of the first switching leg 3 based on a value of I1. In addition, a phase difference between the gate signal of the common switching leg 2 and a gate signal of the second switching leg 4 is controlled based on a value of I2. The current amount I1 flowing to the smoothing circuit 9 and the current amount I2 flowing to the smoothing circuit 10 may be set to be equal to each other, and the current amount I1 flowing to the smoothing circuit 9 and the current amount I2 flowing to the smoothing circuit 10 are not necessarily set to be equal to each other.

In the case of using the current detectors 29 and 30, the current detector 12 can be omitted. In such a case, the output current value Io in the first embodiment and the second embodiment may be controlled as a total current of the current amount I1 flowing to the smoothing circuit 9 and the current amount I2 flowing to the smoothing circuit 10.

Unbalance of the output current of the switching power supply device 1 is mainly caused by element variations of the first switching leg 3 and the second switching leg 4, element variations of the rectifier circuits 7 and 8, element variations of the smoothing circuits 9 and 10, or a wiring variation of the switching power supply device 1. In particular, the output current amount is also large in the heavy load mode, and element breakdown or the like is caused when the current unbalance increases. Thus, there is a risk that the reliability of the switching power supply device deteriorates.

According to the power converter according to the present embodiment, it is possible to control the phase difference from the gate signal of the common switching leg 2 based on the value of I1 and control the phase difference between the gate signal of the common switching leg 2 and the gate signal of the second switching leg 4 based on the value of I2 in the heavy load mode. That is, when the control is performed such that the current amount I1 flowing to the smoothing circuit 9 and the current amount I2 flowing to the smoothing circuit 10 are equal to each other, it is possible to control the current unbalance caused by the element variations of the first switching leg 3 and the second switching leg 4, the element variations of the rectifier circuits 7 and 8, the element variations of the smoothing circuits 9 and 10, or the wiring variation of the switching power supply device 1. Therefore, it is possible to suppress current concentration on the element of the switching power supply device 1, and to increase the service life of the element of the switching power supply device 1. That is, it is possible to enhance the reliability of the switching power supply device 1.

Fourth Embodiment

Figure 10:
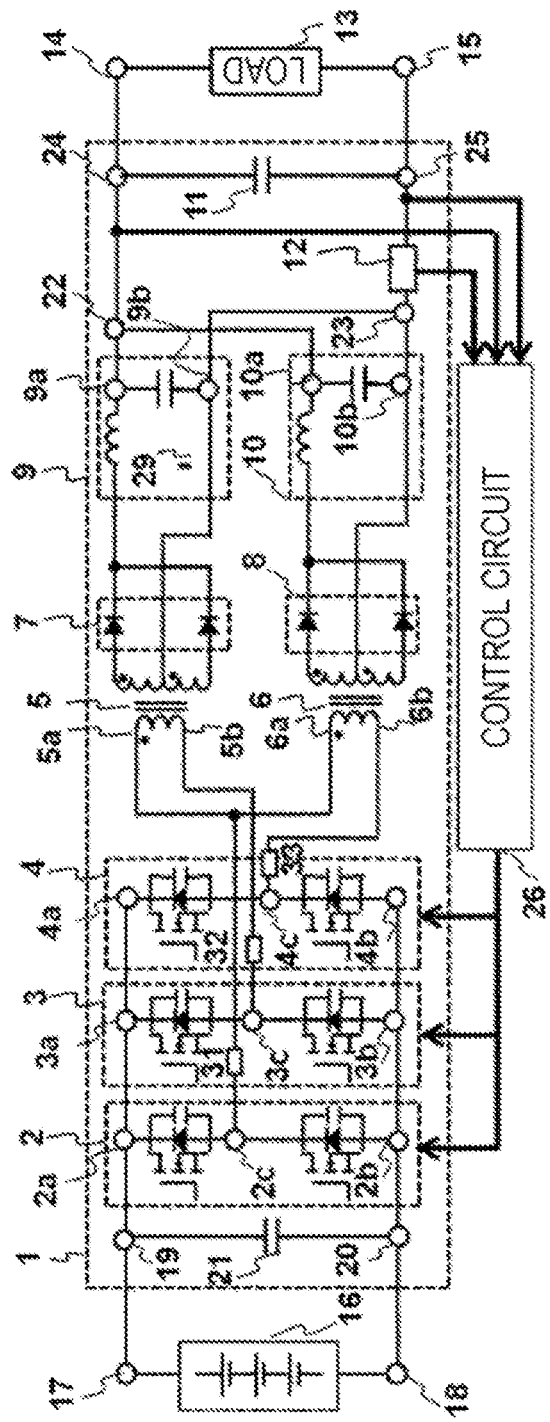
FIG. 10 is a diagram illustrating a configuration of a power converter according to a fourth embodiment.

FIG. 10 is a configuration diagram of a power converter according to a fourth embodiment. The power converter according to the present embodiment is the same as those according to the first to third embodiments except for added elements. The added elements are a current detector 31 that is connected to the midpoint 2c of the common switching element 2, a current detector 32 that is connected to the midpoint 3c of the first switching leg 3, and a current detector 33 that is connected to the midpoint 4c of the second switching leg 4. The control circuit 26 monitors values of the current detectors 31, 32 and 33. Incidentally, the current detectors 31, 32 and 33 may be configured as detection devices capable of detecting each open circuit failure of the common switching element 2, the first switching leg 3, and the second switching leg 4. The other configuration will not be described.

In the configuration according to the present embodiment, it is possible to operate the switching power supply device 1 even at the time of open circuit failure. The operation thereof will be described hereinafter. First, a case where the open circuit failure occurs in the common switching leg 2 will be described.

Figure 11:
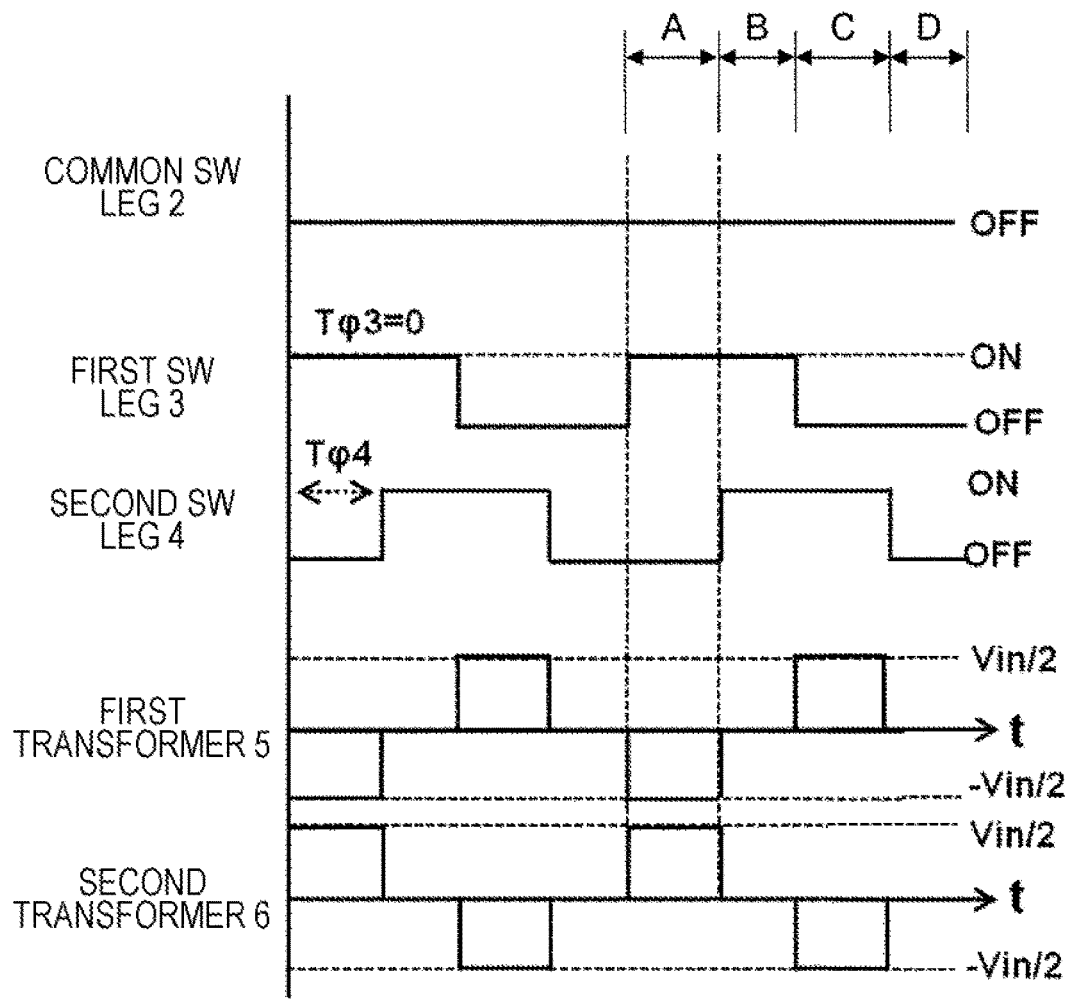
FIG. 11 is gate signal waveforms and transformer application voltage waveforms when open circuit failure occurs in a common switching leg 2 according to the fourth embodiment.

FIG. 11 is gate signal waveforms and transformer application voltage waveforms when the open circuit failure occurs in the common switching leg 2. When the open circuit failure occurs in the common switching leg 2, the current detector 31 detects abnormality and sends an abnormality detection signal to the control circuit 26. When receiving the abnormality detection signal, the control circuit 26 immediately stops the operation of the common switching leg 2. After stopping the common switching leg 2, the switching power supply device 1 is operated using the first switching leg 3 and the second switching leg 4. Since the open circuit failure occurs in the common switching leg 2, a gate signal thereof is constantly turned off.

The control circuit 26 controls the time Tφ4 at which the gate signal of the second switching leg 4 is turned on, based on a time at which the gate signal of the first switching leg 3 of the switching power supply device 1 is turned on such that an output voltage becomes a predetermined value. An application time of an input voltage to the first transformer 5 and the second transformer 6 is controlled by controlling the time Tφ4. At this time, when a switching period of the first switching leg 3 and the second switching leg 4 is denoted by T, the application voltage VT5 to the first transformer 5 and the application voltage VT6 to the second transformer 6 are expressed by the following Formula (5).

[Formula 5]

$$V_{T5}=V_{T6}=V_{in}/2\times 2T_{\phi 4}/T \quad (5)$$

The operation when the open circuit failure occurs in the common switching leg 2 will be described with reference to FIGS. 12(a) to 12(d). Each of FIGS. 12(a) to 12(d) illustrates a current flowing in a circuit on a high voltage battery side corresponding to an operation pattern of each of periods A to D in FIG. 11.

Figure 12A:
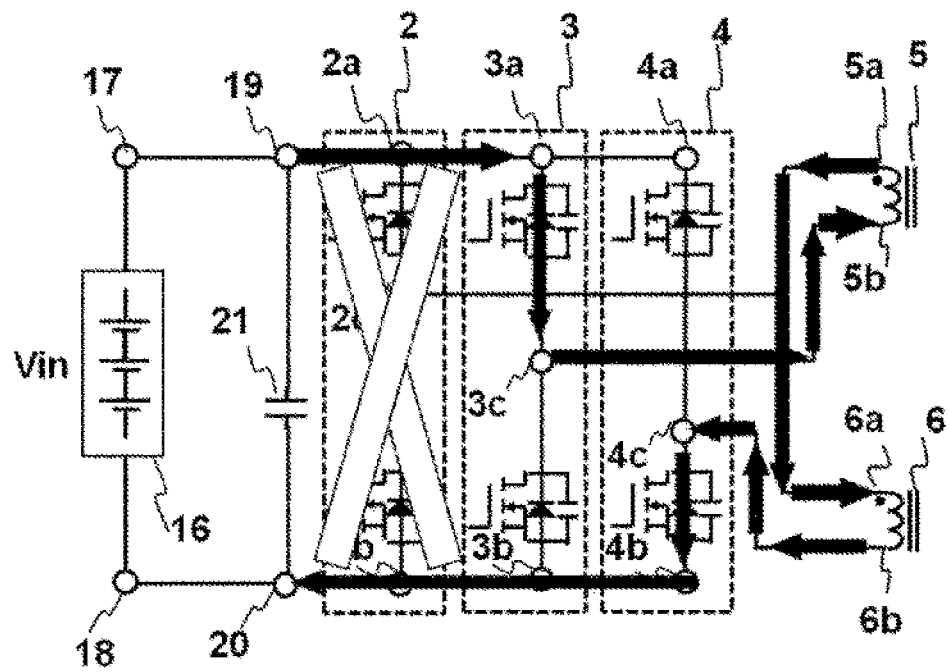
FIG. 12A is a circuit diagram on a high voltage battery side of a switching power supply device in a period A of FIG. 11.

FIG. 12(a) illustrates a circuit diagram on the high voltage battery side of the switching power supply device 1 in a state of the period A of FIG. 11. In the period A of FIG. 11, a gate signal of the first switching leg 3 is turned on, and a gate signal of the second switching leg 4 is turned off. Thus, a potential of the midpoint 3c of the first switching leg 3 is Vin, and a potential of the midpoint 4c of the second switching leg 4 is zero. Since the first transformer 5 and the second transformer 6 are connected in series, the application voltage VT5 to the first transformer 5 becomes Vin/2, and the application voltage VT6 to the second transformer 6 becomes Vin/2.

At this time, a current path of the switching power supply device 1 is given such that a current flows from the input terminal 19 to the one terminal 3a of the first switching leg 3, the midpoint 3c of the first switching leg 3, the first transformer 5, the second transformer 6, the midpoint 4c of the second switching leg 4, the other terminal 4b of the second switching leg 4, the other terminal 2b of the common switching leg 2, and the input terminal 20 in this order.

Figure 12B:
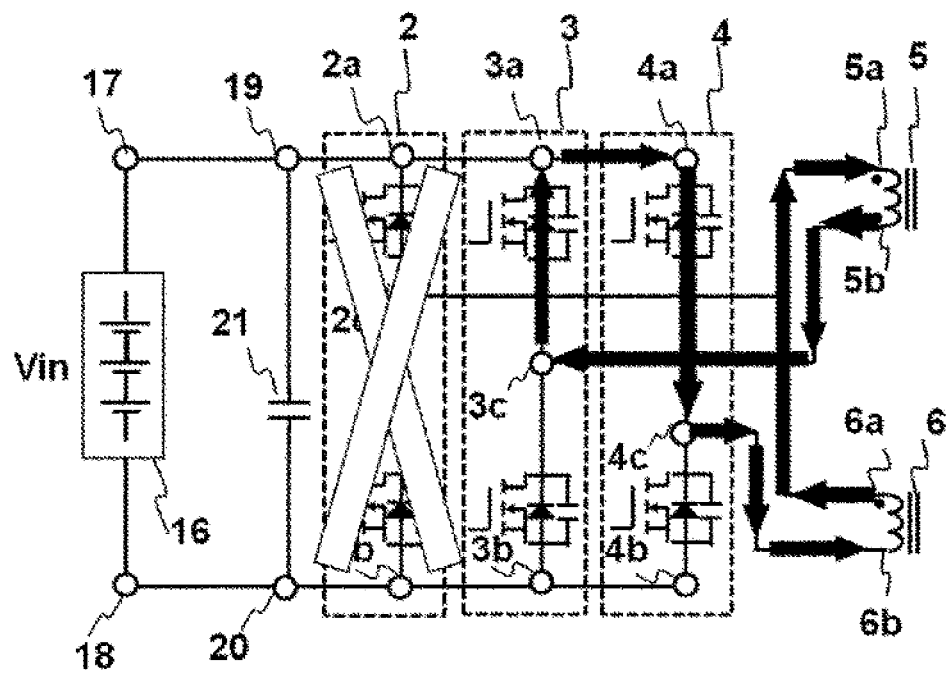
FIG. 12B is a circuit diagram on the high voltage battery side of the switching power supply device in a period B of FIG. 11.

FIG. 12(b) illustrates a circuit diagram on the high voltage battery side of the switching power supply device 1 in a state of the period B of FIG. 11. In the period B of FIG. 11, the gate signals of the first switching leg 3 and the second switching leg 4 are turned on. Thus, the application voltage VT5 to the first transformer 5 becomes zero, and the application voltage VT6 to the second transformer 6 becomes zero.

First, a current path of the switching power supply device 1 is given such that a current flows from the one terminal 3a of the first switching leg 3 to the midpoint 3c of the first switching leg 3, the first transformer 5, the second transformer 6, the midpoint 4c of the second switching leg 4, the one terminal 4a of the second switching leg 4, and the one terminal 3a of the first switching leg 3 in this order. Thereafter, an orientation of the current path is reversed as illustrated in FIG. 12(b).

Figure 12C:
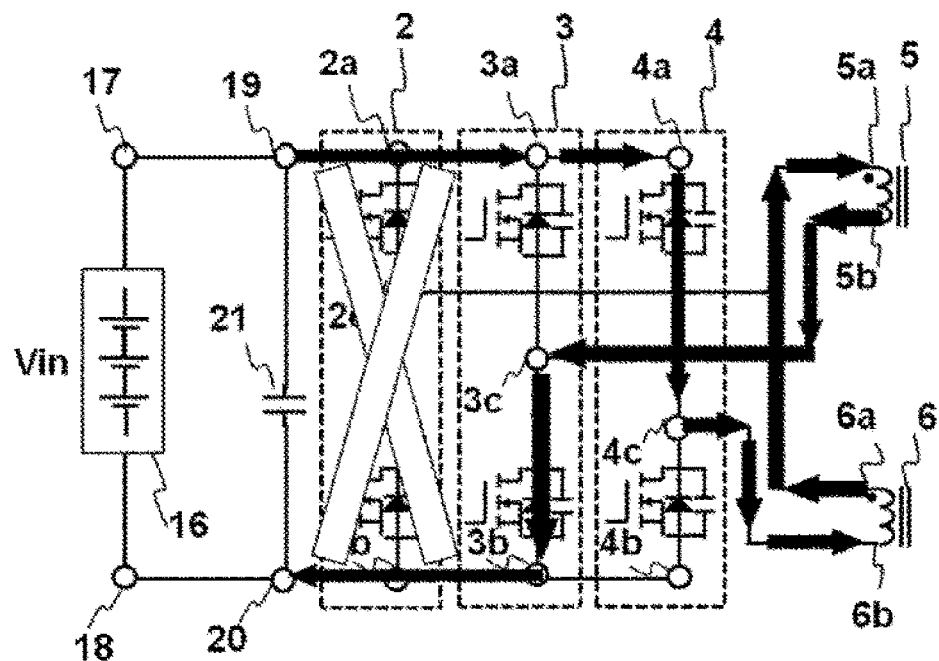
FIG. 12C is a circuit diagram on the high voltage battery side of the switching power supply device in a period C of FIG. 11.

FIG. 12(c) illustrates a circuit diagram on the high voltage battery side of the switching power supply device 1 in a state of the period C of FIG. 11. In the period C of FIG. 11, the potential of the midpoint 3c of the first switching leg 3 is zero, and the potential of the midpoint 4c of the second switching leg 4 is Vin. Thus, the application voltage VT5 to the first transformer 5 becomes Vin/2, and the application voltage VT6 to the second transformer 6 becomes Vin/2.

At this time, a current path of the switching power supply device 1 is given such that a current flows from the input terminal 19 to the one terminal 4a of the second switching leg 4, the midpoint 4c of the second switching leg 4, the second transformer 6, the first transformer 5, the midpoint 3c of the first switching leg 3, the other terminal 3b of the first switching leg 3, and the input terminal 20 in this order.

Figure 12D:
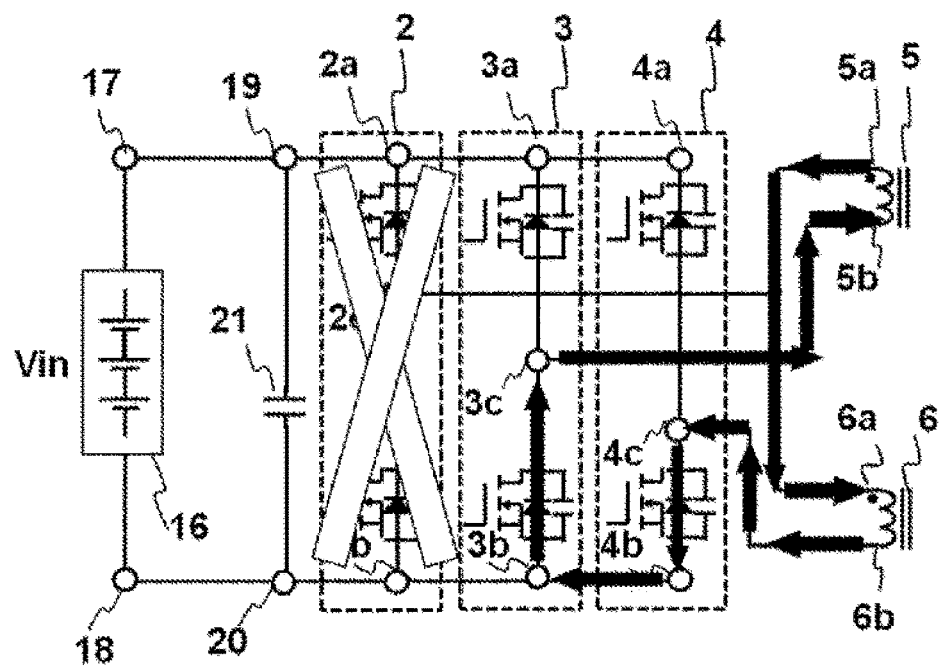
FIG. 12D is a circuit diagram on the high voltage battery side of the switching power supply device in a period D of FIG. 11.
Figure 14A:
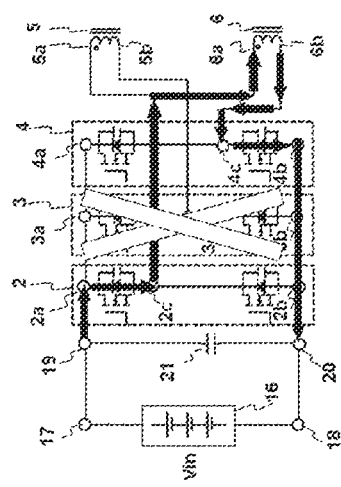
FIG. 14A is a circuit diagram on the high voltage battery side of the switching power supply device in a period A of FIG. 13.
Figure 14B:
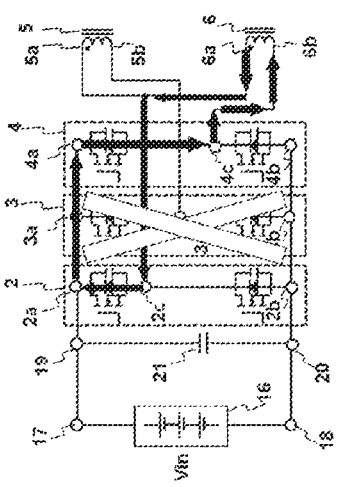
FIG. 14B is a circuit diagram on the high voltage battery side of the switching power supply device in a period B of FIG. 13.
Figure 14C:
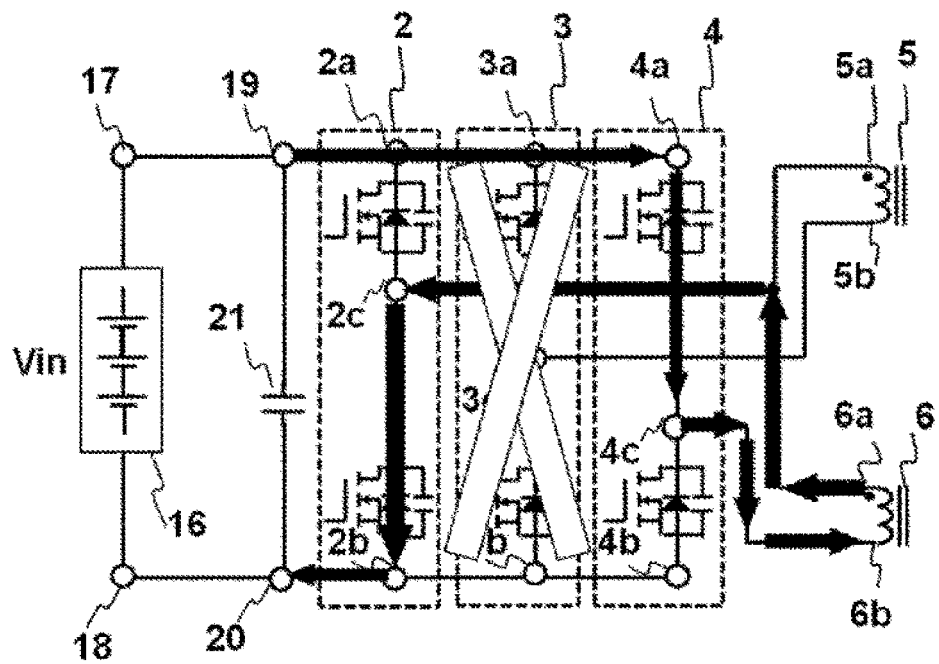
FIG. 14C is a circuit diagram on the high voltage battery side of the switching power supply device in a period C of FIG. 13.
Figure 14D:
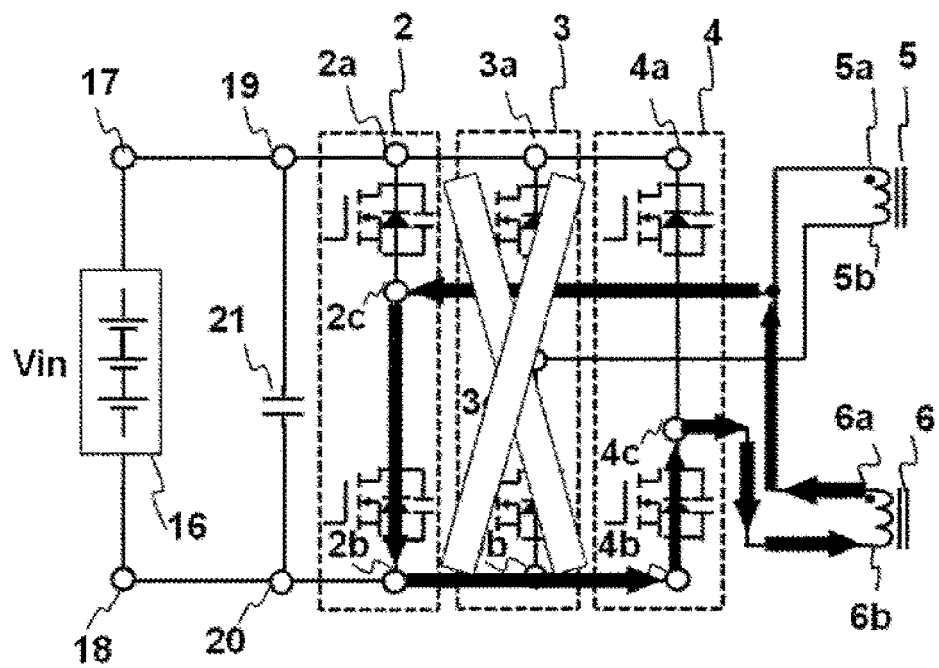
FIG. 14D is a circuit diagram on the high voltage battery side of the switching power supply device in a period D of FIG. 13.

FIG. 12(d) illustrates a circuit diagram on the high voltage battery side of the switching power supply device 1 in a state of the period D of FIG. 11. In the period D of FIG. 11, the gate signals of the first switching leg 3 and the second switching leg 4 are turned off. Thus, the application voltage VT5 to the first transformer 5 becomes zero, and the application voltage VT6 to the second transformer 6 becomes zero.

First, a current path of the switching power supply device 1 is given such that a current flows from the other terminal 3b of the first switching leg 3 to the other terminal 4b of the second switching leg 4, and the midpoint 4c of the second switching leg 4, and to the second transformer 6, the first transformer 6, the midpoint 3c of the first switching leg 3, and the other terminal 3b of the first switching leg 3 in this order. Thereafter, the orientation of the current path is reversed as illustrated in FIG. 12(d).

Incidentally, the description has been given in the above-described present embodiment regarding the circuit operation of controlling the time Tφ4 at which the gate signal of the second switching leg 4 is turned on based on the time at which the gate signal of the first switching leg 3 of the switching power supply device 1 is turned on. However, the time Tφ3 at which the gate signal of the first switching leg 3 is turned on may be controlled based on a time at which the gate signal of the second switching leg 4 of the switching power supply device 1 is turned on.

Next, a case where the open circuit failure occurs in the first switching leg 3 will be described. FIG. 13 is gate signal waveforms and transformer application voltage waveforms when the open circuit failure occurs in the first switching leg 3. When the open circuit failure occurs in the first switching leg 3, the current detector 32 detects abnormality and sends an abnormality detection signal to the control circuit 26. When receiving the abnormality detection signal, the control circuit 26 immediately stops the operation of the first switching leg 3. After stopping the first switching leg 3, the switching power supply device 1 is operated using the common switching leg 2 and the second switching leg 4. Since the open circuit failure occurs in the first switching leg 3, a gate signal thereof is constantly turned off. Incidentally, the case where the open circuit failure occurs in the first switching leg 3 will be described hereinafter, but the same operation is performed even in a case where the open circuit failure occurs in the second switching leg 4.

The control circuit 26 controls the time Tφ4 at which the gate signal of the second switching leg 4 is turned on, based on the time at which the gate signal of the common switching leg 2 of the switching power supply device 1 is turned on such that the output voltage becomes the predetermined value. The application time of the input voltage to the second transformer 6 is controlled by controlling the time Tφ4. At this time, when a switching period of the common switching leg 2 and the second switching leg 4 is denoted by T, the application voltage VT5 to the first transformer 5 and the application voltage VT6 to the second transformer 6 are expressed by the following Formulas (6) and (7).

[Formula 6]

$$V_{T5}=0 \qquad (6)$$

[Formula 7]

$$V_{T6}=V_{in}\times 2T_{\phi 4}/T \qquad (7)$$

The operation when the open circuit failure occurs in the first switching leg 3 will be described with reference to FIGS. 14(*a*) to 14(*d*). Each of FIGS. 14(*a*) to 12(*d*) illustrates a current flowing in a circuit on a high voltage battery side corresponding to an operation pattern of each of periods A to D in FIG. 13.

FIG. 14(*a*) illustrates a circuit diagram on the high voltage battery side of the switching power supply device 1 in a state of the period A of FIG. 13. In the period A of FIG. 13, a gate signal of the common switching leg 2 is turned on, and a gate signal of the second switching leg 4 is turned off. Thus, a potential of the midpoint 2*c* of the common switching leg 2 is Vin, and a potential of the midpoint 4*c* of the second switching leg 4 is zero. Accordingly, the application voltage VT5 to the first transformer 5 becomes zero, and the application voltage VT6 to the second transformer 6 becomes Vin.

At this time, a current path of the switching power supply device 1 is given such that a current flows from the input terminal 19 to the one terminal 2*a* of the common switching leg 2, the midpoint 2*c* of the common switching leg 2, the second transformer 6, the midpoint 4*c* of the second switching leg 4, the other terminal 4*b* of the second switching leg 4, the other terminal 2*b* of the common switching leg 2, and the input terminal 20 in this order.

FIG. 14(*b*) illustrates a circuit diagram on the high voltage battery side of the switching power supply device 1 in a state of the period B of FIG. 13. In the period B of FIG. 13, the gate signals of the common switching leg 2 and the second switching leg 4 are turned on. Thus, the application voltage VT5 to the first transformer 5 becomes zero, and the application voltage VT6 to the second transformer 6 becomes zero.

First, a current path of the switching power supply device 1 is given such that a current flows from the one terminal 2*a* of the common switching leg 2 to the midpoint 2*c* of the common switching leg 2, the second transformer 6, the midpoint 4*c* of the second switching leg 4, the one terminal 4*a* of the second switching leg 4, and the one terminal 3*a* of the first switching leg 3 in this order. Thereafter, an orientation of the current path is reversed as illustrated in FIG. 14(*b*).

FIG. 14(*c*) illustrates a circuit diagram on the high voltage battery side of the switching power supply device 1 in a state of the period C of FIG. 13. In the period C of FIG. 13, the potential of the midpoint 2*c* of the common switching leg 2 is zero, and the potential of the midpoint 4*c* of the second switching leg 4 is Vin. Thus, the application voltage VT5 to the first transformer 5 becomes zero, and the application voltage VT6 to the second transformer 6 becomes Vin.

At this time, a current path of the switching power supply device 1 is given such that a current flows from the input terminal 19 to the one terminal 4*a* of the second switching leg 4, the midpoint 4*c* of the second switching leg 4, the second transformer 6, the midpoint 2*c* of the common switching leg 2, the other terminal 2*b* of the common switching leg 2, and the input terminal 20 in this order.

FIG. 14(*d*) illustrates a circuit diagram on the high voltage battery side of the switching power supply device 1 in a state of the period D of FIG. 13. In the period D of FIG. 13, the gate signals of the common switching leg 2 and the second switching leg 4 are turned off. Thus, the application voltage VT5 to the first transformer 5 becomes zero, and the application voltage VT6 to the second transformer 6 becomes zero.

First, a current path of the switching power supply device 1 is given such that a current flows to the other terminal 2*b* of the common switching leg 2, the other terminal 4*b* of the second switching leg 4, the midpoint 4*c* of the second switching leg 4, the second transformer 6, the midpoint 2*c* of the common switching leg 2, the other terminal 2*b* of the common switching leg 2 in this order. Thereafter, the orientation of the current path is reversed as illustrated in FIG. 14(*d*).

Incidentally, the description has been given in the above-described present embodiment regarding the circuit operation of controlling the time Tφ4 at which the gate signal of the second switching leg 4 is turned on based on the time at which the gate signal of the common switching leg 2 of the switching power supply device 1 is turned on. However, a time at which the gate signal of the common switching leg 2 is turned on may be controlled based on a time at which the gate signal of the second switching leg 4 of the switching power supply device 1 is turned on.

There is a case where failure of an element occurs in the switching power supply device 1 due to heat concentration on the element, an overcurrent, an overvoltage, and external factors such as vibration and stress. In particular, when the open circuit failure occurs in the common switching element 2, the first switching leg 3, or the second switching leg 4, it is difficult to apply the input voltage to the transformer using the respective switching legs, and it is necessary to stop the switching power supply device 1. However, the switching power supply device 1, particularly in a car, is a device that supplies power to an air conditioner, an audio, a controller of the car, and thus, there is the possibility of causing a serious car accident when the failure occurs in the switching leg during traveling and the controller of the car does not operate. Thus, it is important and necessary for the switching power supply device 1 to be kept in the operable state even when the open circuit failure occurs.

According to the power converter according to the present embodiment, it is possible to continue the operation of the switching power supply device 1 even when the open circuit failure occurs in the common switching leg 2, the first switching leg 3, or the second switching leg 4 by sending the abnormality detection signal to the control circuit 26 using the current detector 31 connected to the midpoint $2c$ of the common switching leg 2, the current detector 32 connected to the midpoint $3c$ of the first switching leg 3, and the current detector 33 connected to the midpoint $4c$ of the second switching leg 4 in a case where the open circuit failure occurs in each of the switching legs. Therefore, it is possible to keep the operable state of the switching power supply device 1 even when the open circuit failure occurs in the switching leg, and it is possible to enhance the reliability of the switching power supply device 1. In addition, it is possible to operate the controller of the car even at the time of failure in the car employing the switching power supply device 1 according to the present embodiment, and thus, it is possible to suppress the car accident.

Fifth Embodiment

Figure 15:
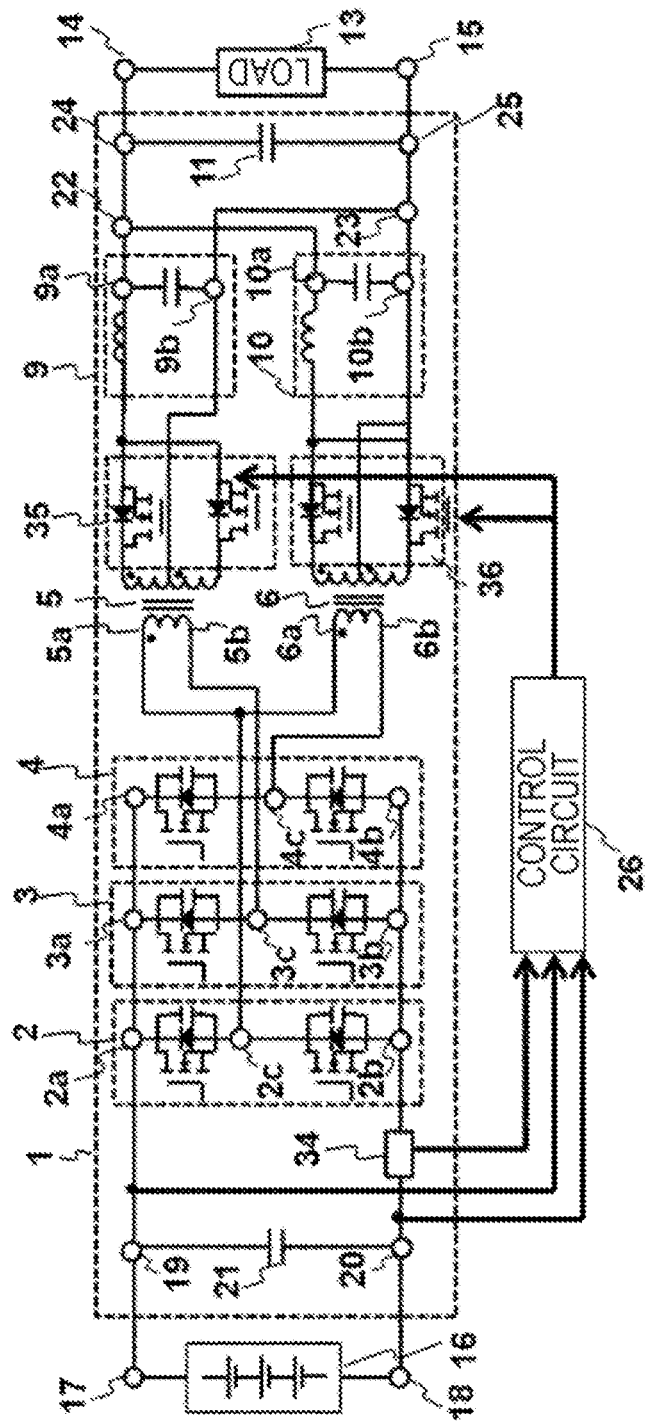
FIG. 15 is a diagram illustrating a configuration of a power converter according to a fifth embodiment.

FIG. 15 is a configuration diagram of a power converter according to a fifth embodiment. The power converter according to the present embodiment is the same as those according to the first to fourth embodiments except for changed and added elements. The changed elements are a low-voltage-side circuit in which the smoothing circuit 7 is configured using switching elements and a low-voltage-side circuit 36 in which the smoothing circuit 8 is configured using switching elements. The added element is a current detector 34 that is connected between the other terminal $2b$ of the common switching leg 2 and the input terminal 20. The other configuration will not be described.

In the configuration according to the present embodiment, it is possible to operate the switching power supply device 1 even at the time of a step-up operation. The operation thereof will be described hereinafter.

The control circuit 26 monitors a voltage of the input capacitor 21 and a current detected by the current detector 34. The control circuit 26 controls the operations of the low-voltage-side circuit 35 configured using the switching elements, the low-voltage-side circuit 36 configured using the switching elements, and the common switching leg 2, the first switching leg 3, and the second switching leg 4 of the switching power supply device 1 such that a capacitor voltage on a high voltage battery side becomes a predetermined value, based on the detected current. Herein, an (input) voltage between the input terminals 19 and 20 of the switching power supply device 1 is defined as VHV, an (output) voltage between the output terminals 24 and 25 is defined as VLV, a current detected by the current detector 34 is defined as Ii, and a maximum value of the current is defined as Iimax.

There are two modes of a heavy load mode in which a load is large and a light load mode in which a load is small in the switching power supply device 1. When a current value that changes a control operation mode is denoted by Ic2, a condition of Ic2 is that a value of Ic is smaller than Iimax (Ic2<Iimax).

A method of determining the value of Ic2 can be arbitrarily set, such as a method of determining a current value which enables the conversion efficiency of the switching power supply device 1 to be equal between the heavy load mode and the light load mode. Hereinafter, details of the heavy load mode and the light load mode will be described. Incidentally, a case where a potential of the input terminal 20 is zero is described hereinafter. When the potential of the input terminal 20 is not zero, the potential of the input terminal 20 is added to each potential.

In a state where Ii is larger than Ic2, and Ii is smaller than Iimax (Ic2<Ii<Iimax), control is executed in in the heavy load mode to be described later. In addition, the load mode may be selected using a current sensor 12 on a low voltage side which is described in the first to the fourth embodiments.

Figure 16:
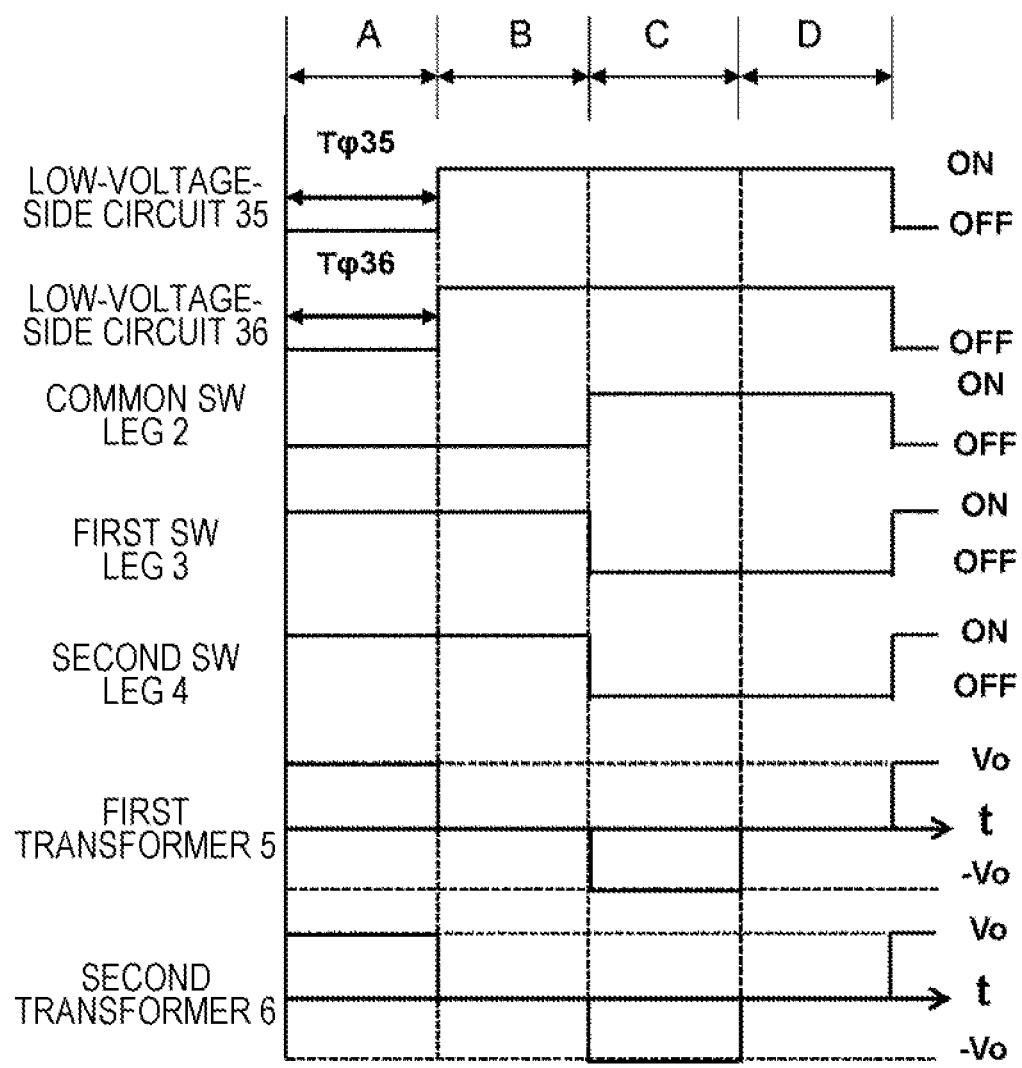
FIG. 16 is gate signal waveforms and transformer application voltage waveforms in a heavy load mode according to the fifth embodiment.

FIG. 16 is a graph illustrating gate signal waveforms and transformer application voltages in the heavy load mode. The gate signal waveforms in FIG. 16 illustrate one switching element of the low-voltage-side circuit 35 configured using the switching elements, and one switching element of the low-voltage-side circuit 36 configured using the switching elements, and illustrate gate voltages applied to the switching elements connected to the input terminal 19 side of the switching power supply device 1 among the switching elements forming the respective switching legs. Incidentally, waveforms of gate signals applied to the one switching element of the low-voltage-side circuit 35 configured using the switching elements, the one switching element of the low-voltage-side circuit 36 configured using the switching elements, and the switching element connected to the input terminal 20 side are waveforms obtained by shifting the gate signals illustrated in FIG. 16 by ½ period.

In the heavy load mode, a time Tφ35 at which the gate signal of the one switching element of the low-voltage-side circuit 35 configured using the switching elements is turned on and a time Tφ36 at which the gate signal of the one switching element of the low-voltage-side circuit 36 configured using the switching elements is turned on are controlled such that the (input) voltage VHV between the input terminals 19 and 20 of the switching power supply device 1 becomes a predetermined value. An application time of a voltage to the first transformer 5 is controlled by controlling the time Tφ35. In addition, an application time of a voltage to the second transformer 6 is controlled by controlling Tφ36. In addition, a rectification operation is performed by the first transformer 5 and the second transformer using the common switching leg 2, the first switching leg 3, and the second switching leg 4 on the high voltage side.

The operation in the heavy load mode will be described with reference to FIGS. 17(a) to 17(d). Each of FIGS. 17(a) to 17(d) illustrates a current flowing in a circuit corresponding to an operation pattern of each of periods A to D in FIG. 16.

Figure 17A:
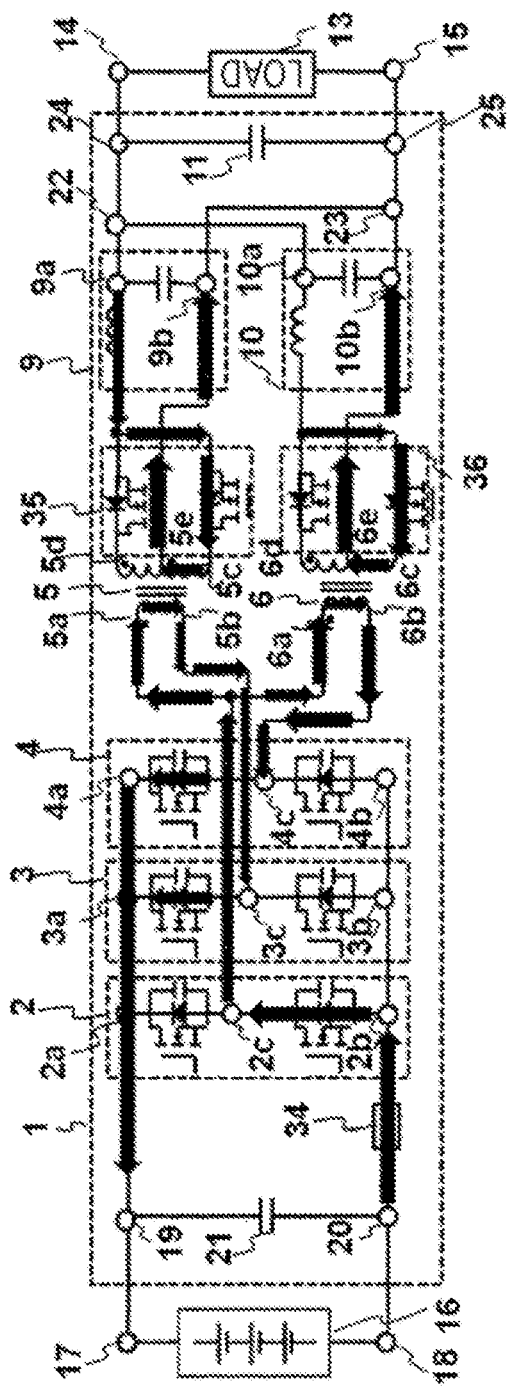
FIG. 17A is a circuit diagram on a high voltage battery side of a switching power supply device in a period A of FIG. 16.

FIG. 17(a) illustrates a circuit diagram of the switching power supply device 1 in a state of the period A of FIG. 16. In the period A of FIG. 16, the gate signal of the one switching element of the low-voltage-side circuit 35 configured using the switching elements is turned off, and the gate signal of the one switching element of the low-voltage-side circuit 35 configured using the switching elements is turned off. In addition, a gate signal of the common switching leg 2 is turned off, a gate signal of the first switching leg 3 is turned on, and a gate signal of the second switching leg 4 is turned on. Thus, a voltage is applied from one terminal 5c of the transformer 5 on the low voltage side to a midpoint 5e of the transformer 5 on the low voltage side. The applied voltage is stepped up depending on a turn ratio of the transformer, and the voltage is applied from the one terminal 5a of the transformer 5 on the high voltage side to the one terminal 5b of the transformer 5 on the high voltage side. The voltage on the high voltage side is rectified by a switching element at a lower side of the common switching leg 2 and a switching element at an upper side of the first switching leg 3, and supplies power to the high voltage battery 16.

At this time, a current flowing from the output terminal 24 to the low-voltage-side circuit 35 configured using the switching elements passes through a switching element on the transformer terminal 5c side of the low-voltage circuit 35, flows from the one terminal 5c of the transformer 5 on the low voltage side to the midpoint 5e of the transformer 5, and flows to the output terminal 23. In addition, the current flows from the one terminal 5a on the high voltage side to the other terminal 5b on the high voltage side in the transformer 5 by the voltage applied to the high voltage side using the transformer 5. The voltage is rectified by the switching element at the lower side of the common switching leg 2, the switching element at the upper side of the first switching leg 3, and a switching element at an upper side of the second switching leg 4 and supplies power to the high voltage battery 18. The power is supplied to the high voltage battery 16 by the switching element at the lower side of the common switching leg 2 and the switching element at the upper side of the first switching leg 3.

In addition, the low-voltage-side circuit 36 configured using the switching elements, and the switching element at the lower side of the common switching leg 2, and the switching element at the upper side of the second switching leg 4, which are connected to the transformer 6, operate in the same manner as the low-voltage-side circuit 35 configured using the switching elements, the switching element at the lower side of the common switching leg 2, and the switching element at the upper side of the first switching leg 3 which are connected to the transformer 5.

Figure 17B:
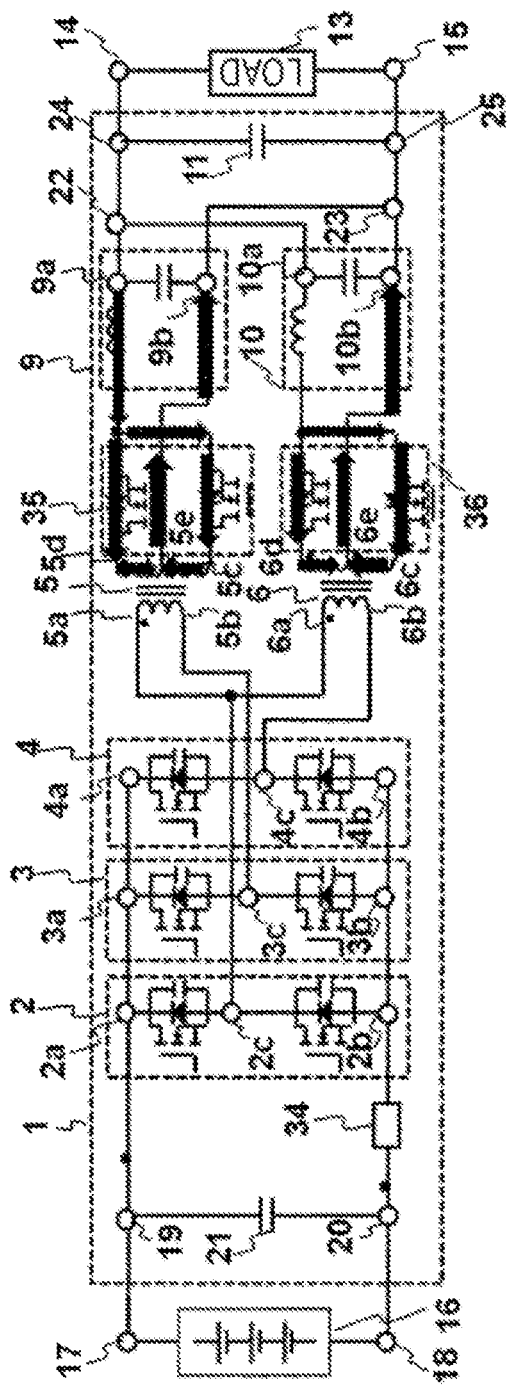
FIG. 17B is a circuit diagram on the high voltage battery side of the switching power supply device in a period B of FIG. 16.

FIG. 17(b) illustrates a circuit diagram of the switching power supply device 1 in a state of the period B of FIG. 16. In the period B of FIG. 16, the application voltage to the first transformer 5 is applied such that a voltage is applied from the one terminal 5c of the transformer 5 on the low voltage side to the midpoint 5e of the transformer 5 on the low voltage side, and a voltage is applied from the other terminal 5d of the transformer 5 on the low voltage side to the midpoint 5e of the transformer 5 on the low voltage side. Orientations of these two voltages are opposite to each other, and thus, the voltages cancel each other out. Thus, a state where no voltage is applied between the one terminal 5a of the transformer 5 on the high voltage side and the one terminal 5b of the transformer 5 on the high voltage side is formed. The same description is also applied for the transformer 6. A current path is given such that a current passes through a switching element on the transformer terminal 5c side of the low-voltage circuit 35 from the output terminal 24, and flows from the one terminal 5c of the transformer 5 to the midpoint 5e of the transformer 5, and the current flows to the output terminal 25. In addition, the current passes through the switching element on the transformer terminal 5d side of the low-voltage circuit 35 from the output terminal 24, and flows from the other terminal 5d of the transformer 5 to the midpoint 5e of the transformer 5, and the current flows to the output terminal 25. The same description is also applied for the low-voltage circuit 36, and thus, the description thereof will be omitted.

Figure 17C:
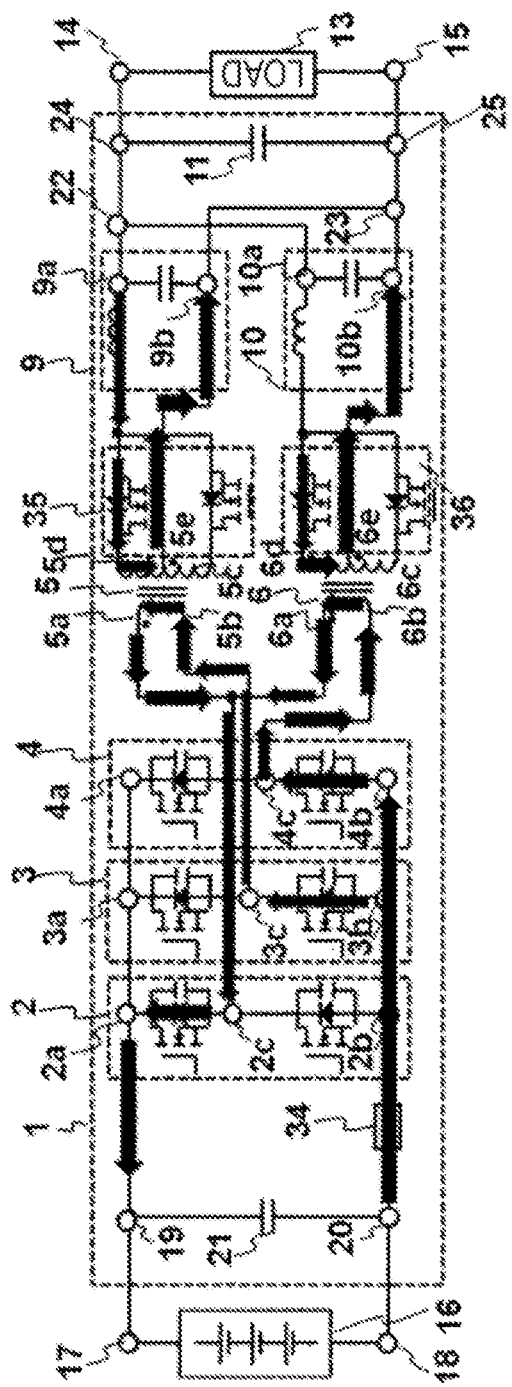
FIG. 17C is a circuit diagram on the high voltage battery side of the switching power supply device in a period C of FIG. 16.

FIG. 17(c) illustrates a circuit diagram of the switching power supply device 1 in a state of the period C of FIG. 16. In this period, the above-described voltage and current path in the state of the period A of FIG. 16 operates in a reverse manner. The details thereof will be omitted.

Figure 17D:
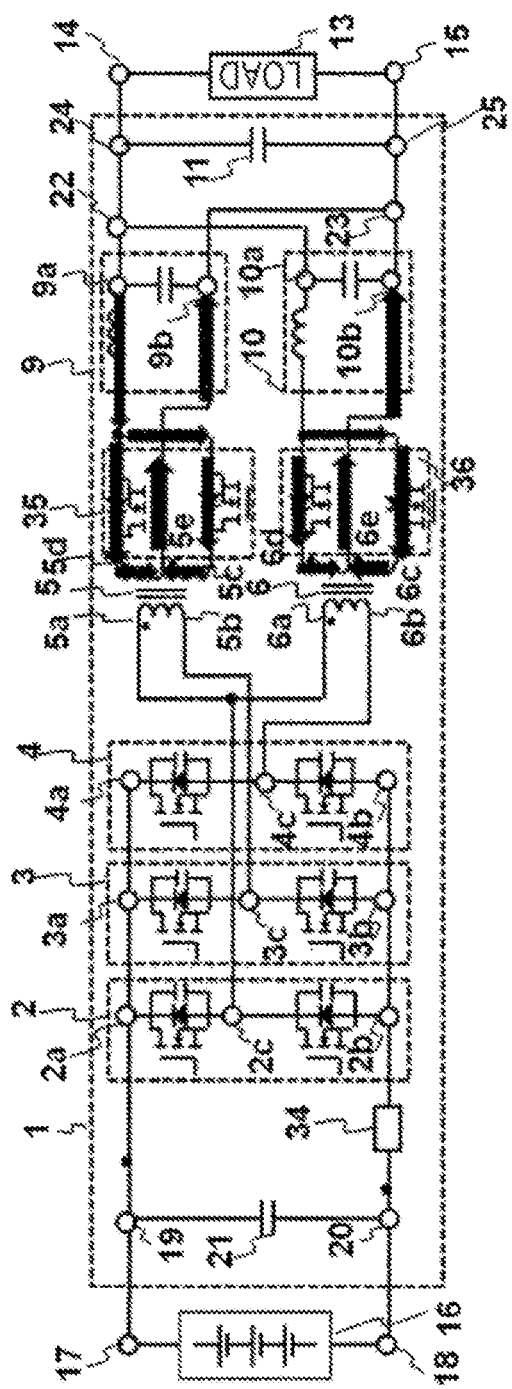
FIG. 17D is a circuit diagram on the high voltage battery side of the switching power supply device in a period D of FIG. 16.

FIG. 17(d) illustrates a circuit diagram of the switching power supply device 1 in a state of the period D of FIG. 16. In this period, the same operation is performed as in the state of the period B of FIG. 16 described above, and the description thereof will be omitted.

In a state where Ii is smaller than Ic2, and Ii is larger than zero (0<Ii<Ic2), control is executed in the light load mode to be described later. In addition, the load mode may be selected using a current sensor 12 on a low voltage side which is described in the first to the fourth embodiments.

Figure 18:
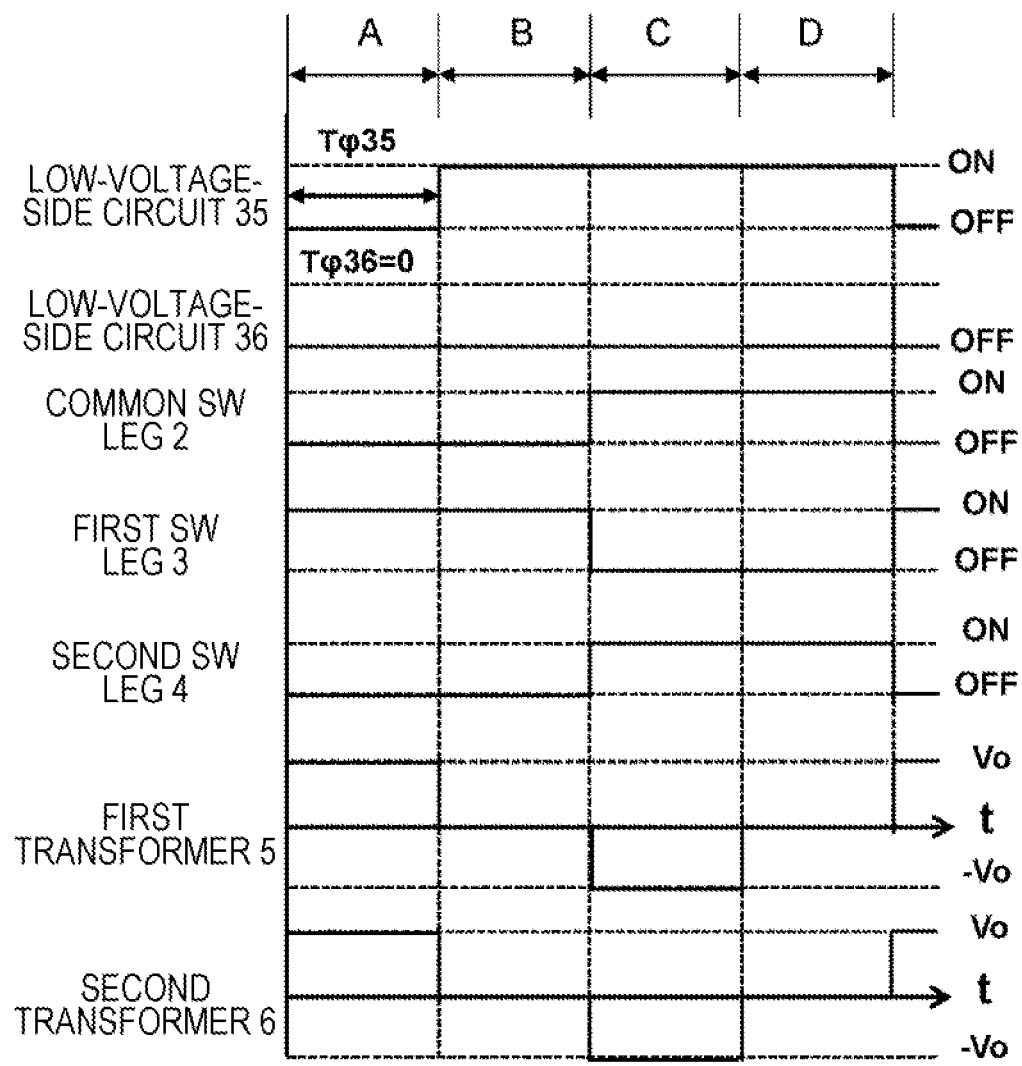
FIG. 18 is gate signal waveforms and transformer application voltage waveforms in a light load mode according to the fifth embodiment.

FIG. 18 is a graph illustrating gate signal waveforms and transformer application voltages in the light load mode. The gate signal waveforms in FIG. 18 illustrate one switching element of the low-voltage-side circuit 35 configured using the switching elements, and one switching element of the low-voltage-side circuit 36 configured using the switching elements, and illustrate gate voltages applied to the switching elements connected to the input terminal 19 side of the switching power supply device 1 among the switching elements forming the respective switching legs. Incidentally, waveforms of gate signals applied to the one switching element of the low-voltage-side circuit 35 configured using the switching elements, the one switching element of the low-voltage-side circuit 36 configured using the switching elements, and the switching element connected to the input terminal 20 side are waveforms obtained by shifting the gate signals illustrated in FIG. 18 by ½ period.

In the light load mode, the control circuit 26 controls the time Tφ35 at which the gate signal of the one switching element of the low-voltage-side circuit 35 configured using the switching elements is turned on such that the (input) voltage VHV between the input terminals 19 and 20 of the switching power supply device 1 becomes a predetermined value, and sets the time Tφ36 at which the gate signal of the one switching element of the low-voltage-side circuit 36 configured using the switching elements is turned on to zero. An application time of a voltage to the first transformer 5 is controlled by controlling the time Tφ35. In addition, no voltage is applied to the transformer 6 since Tφ36 is zero. In addition, a rectification operation is performed by the first transformer 5 and the second transformer using the common switching leg 2 and the first switching leg 3 on the high voltage side. The gate signal of the second switching leg 4 is set such that the phase difference from the gate signal of the common switching leg 2 becomes zero.

The operation in the light load mode will be described with reference to FIGS. 19(a) to 19(d). Each of FIGS. 19(a) to 19(d) illustrates a current flowing in a circuit corresponding to an operation pattern of each of periods A to D in FIG. 18.

Figure 19A:
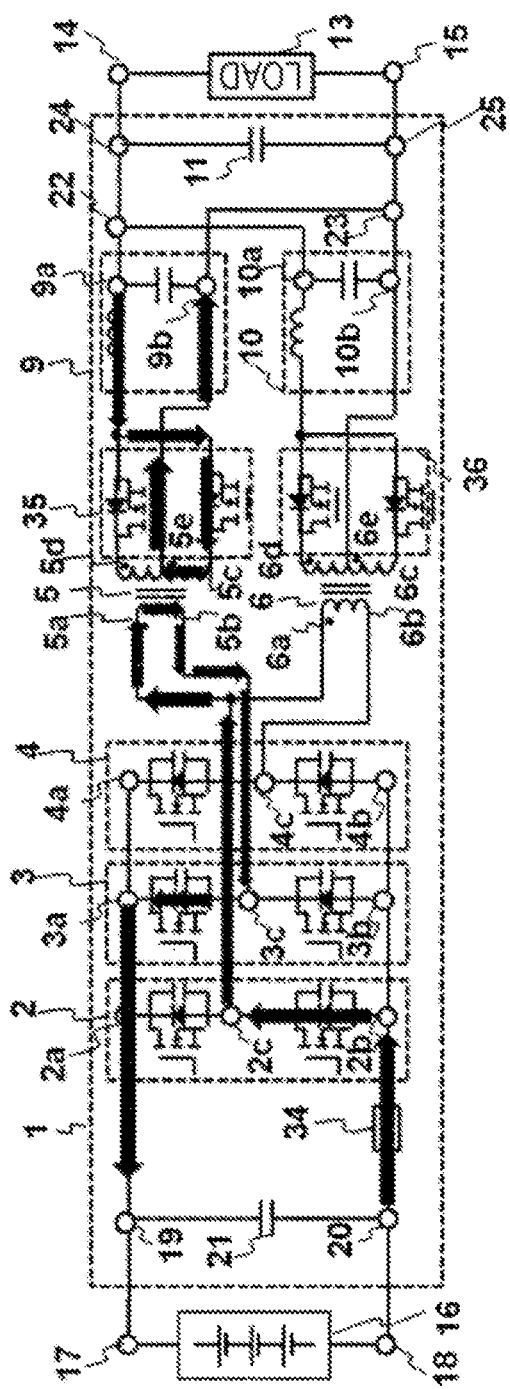
FIG. 19A is a circuit diagram on the high voltage battery side of the switching power supply device in a period A of FIG. 18.

FIG. 19(a) illustrates a circuit diagram of the switching power supply device 1 in a state of the period A of FIG. 18. In the period A of FIG. 18, the gate signal of the one switching element of the low-voltage-side circuit 35 configured using the switching elements is turned off, and the gate signal of the one switching element of the low-voltage-side circuit 35 configured using the switching elements is turned off. In addition, the gate signal of the common switching leg 2 is turned off, the gate signal of the first switching leg 3 is turned on, and the gate signal of the second switching leg 4 is turned off. Thus, a voltage is applied from one terminal 5c of the transformer 5 on the low voltage side to a midpoint 5e of the transformer 5 on the low voltage side. The applied voltage is stepped up depending on a turn ratio of the transformer, and the voltage is applied from the one terminal 5a of the transformer 5 on the high voltage side to the one terminal 5b of the transformer 5 on the high voltage side. The voltage on the high voltage side is rectified by a switching element at the lower side of the common switching leg 2 and a switching element at an upper side of the first switching leg 3, and supplies power to the high voltage battery 16.

At this time, a current flowing from the output terminal 24 to the low-voltage-side circuit 35 configured using the switching elements passes through a switching element on the transformer terminal 5c side of the low-voltage circuit 35, flows from the one terminal 5c of the transformer 5 on the low voltage side to the midpoint 5e of the transformer 5, and flows to the output terminal 23. In addition, the current flows from the one terminal 5a on the high voltage side to the other terminal 5b on the high voltage side in the transformer 5 by the voltage applied to the high voltage side using the transformer 5. The voltage is rectified by the switching element at the lower side of the common switching leg 2, the switching element at the upper side of the first switching leg 3, and a switching element at an upper side of the second switching leg 4 and supplies power to the high voltage battery 18. The power is supplied to the high voltage battery 16 by the switching element at the lower side of the common switching leg 2 and the switching element at the upper side of the first switching leg 3.

On the other hand, the gate signal of the one switching element of the low-voltage-side circuit 36 is turned off, and a gate signal of the other switching element of the low-voltage-side circuit 36 is also turned off in the low-voltage-side circuit 36 configured using the switching elements connected to the transformer 6, and thus, no voltage is applied to the transformer 6. In addition, both the switching element at the lower side of the common switching leg 2 and the switching element at a lower side of the second switching leg 4 turned on so that the potentials of the midpoint 2c of the common switching leg 2 and the midpoint 4c of the second switching leg 4 are equal, and thus, no voltage is applied to the transformer 6.

Figure 19B:
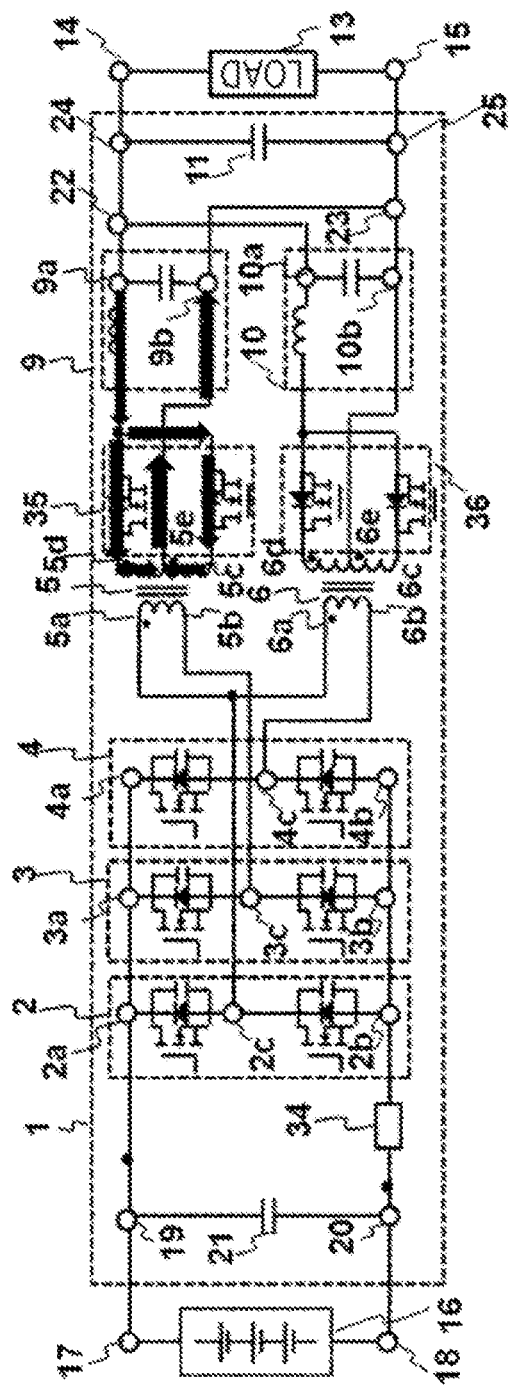
FIG. 19B is a circuit diagram on the high voltage battery side of the switching power supply device in a period B of FIG. 18.

FIG. 19(b) illustrates a circuit diagram of the switching power supply device 1 in a state of the period B of FIG. 18. In the period B of FIG. 18, the application voltage to the first transformer 5 is applied such that a voltage is applied from the one terminal 5c of the transformer 5 on the low voltage side to the midpoint 5e of the transformer 5 on the low voltage side, and a voltage is applied from the other terminal 5d of the transformer 5 on the low voltage side to the midpoint 5e of the transformer 5 on the low voltage side. Orientations of these two voltages are opposite to each other, and thus, the voltages cancel each other out. Thus, a state where no voltage is applied between the one terminal 5a of the transformer 5 on the high voltage side and the one terminal 5b of the transformer 5 on the high voltage side is formed. The same description is also applied for the transformer 6. A current path is given such that a current passes through one switching element of the low-voltage circuit 35 from the output terminal 24, and flows from the one terminal 5c of the transformer 5 to the midpoint 5e of the transformer 5, and the current flows to the output terminal 25. In addition, the current passes through the other switching element of the low-voltage circuit 35 from the output terminal 24, and flows from the other terminal 5d of the transformer 5 to the midpoint 5e of the transformer 5, and the current flows to the output terminal 25. The same operation as in the state of the period A of FIG. 18 is also performed for the low-voltage circuit 36, and thus, the description thereof will be omitted.

Figure 19C:
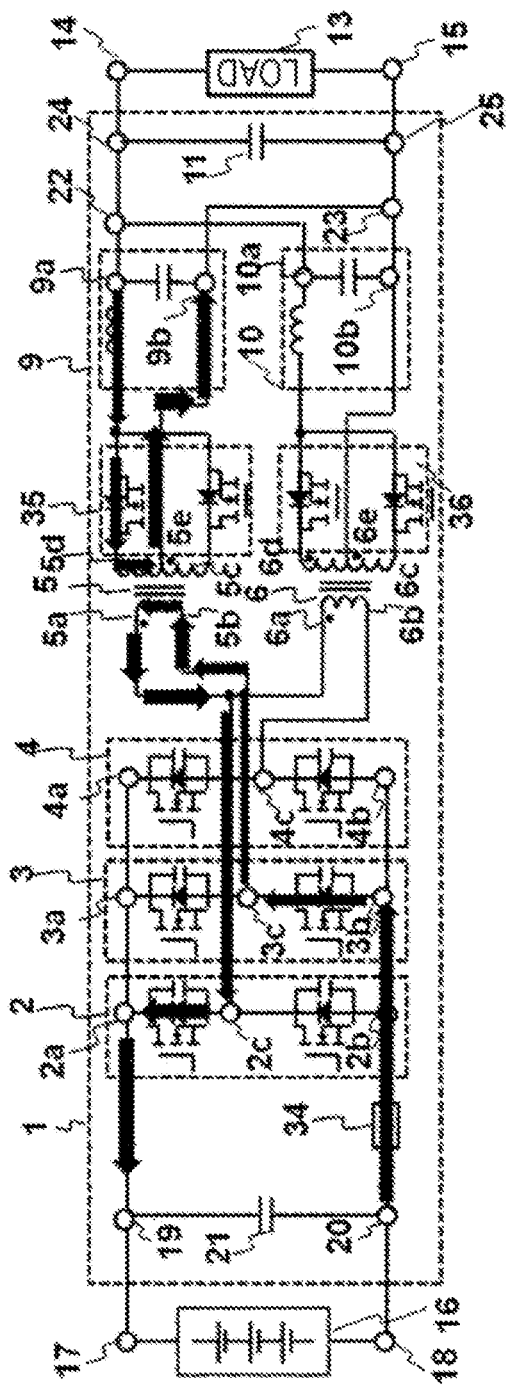
FIG. 19C is a circuit diagram on the high voltage battery side of the switching power supply device in a period C of FIG. 18.
Figure 19D:
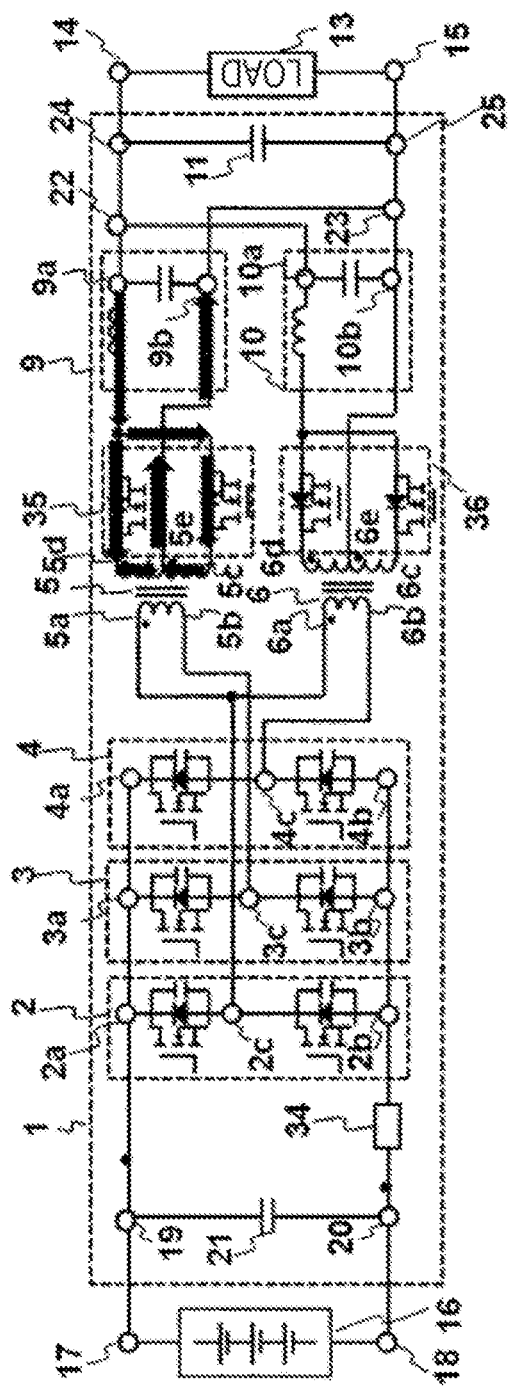
FIG. 19D is a circuit diagram on the high voltage battery side of the switching power supply device in a period D of FIG. 18.

FIG. 19(c) illustrates a circuit diagram of the switching power supply device 1 in a state of the period C of FIG. 18. In this period, the above-described voltage and current path in the state of the period A of FIG. 18 operates in a reverse manner. The details thereof will be omitted.

FIG. 18(d) illustrates a circuit diagram of the switching power supply device 1 in a state of the period D of FIG. 19. In this period, the same operation is performed as in the state of the period B of FIG. 18 described above, and the description thereof will be omitted.

Incidentally, the gate signal of the switching element of the low-voltage-side circuit 36 is set to zero, and the phase difference between the gate signals of the common switching leg and the second switching leg 4 is set to zero in the above-described present embodiment. However, any low-voltage-side circuit and any switching leg may be set to zero, the low-voltage-side circuit 35 may be set to zero, and the phase difference between the gate signals of the first switching leg 3 and the common switching leg 1 may be set to zero. In addition, an order of setting the phase difference to zero may be indefinite. For example, the first switching leg 3 may be constantly set as a switching leg for which the phase difference is set to zero, or switching legs for which the phase difference is set to zero may be alternated.

According to the power converter according to the present embodiment, the input voltage is applied to the first transformer 5 and the second transformer 6 in the heavy load mode (Ic<Ii<Iimax), and it is possible to reduce the copper loss of the switching power supply device 1 through the parallel operation. In addition, the application voltage to the second transformer 6 becomes zero in the light load mode (0<Ii<Ic) so that it is possible to reduce a fixed loss of the switching power supply device 1. That is, it is possible to improve the conversion efficiency even in the step-up operation in the entire load region of the switching power supply device 1. Further, it is possible to reduce the number of switching elements by providing the common switching leg 1, it is possible to reduce a size and cost of the switching power supply device.

REFERENCE SIGNS LIST

1: switching power supply device
2: common switching leg
3: first switching leg
4: second switching leg
5: first transformer
6: second transformer
7, 8: rectifier circuit
9, 10: smoothing circuit
11: output capacitor
12, 29, 30, 31, 32, 33, 34: current detector
13: load
14: one terminal of load
15: other terminal of load
16: high voltage battery 17: positive electrode of high voltage battery
18: negative electrode of high voltage battery
19, 20: input terminal
21: input capacitor
22, 23: connection terminal
24, 25: output terminal
26: control circuit
27, 28: temperature detector
35, 36: low-voltage-side circuit

The invention claimed is:

1. A power converter comprising:
a common switching leg that is connected to one end of a primary side of a first transformer and is connected to one end of a second transformer;
a first switching leg that is connected to another end of the primary side of the first transformer;
a second switching leg that is connected to another end of a primary side of the second transformer;
a first secondary circuit that is connected to a secondary side of the first transformer; and
a second secondary circuit that is connected to a secondary side of the second transformer, wherein
the common switching leg, the first switching leg, and the second switching leg are electrically connected, in parallel, to an input terminal,
the first secondary circuit and the second secondary circuit are electrically connected, in parallel, to an output terminal,
when a phase difference between a switching control signal of the common switching leg and a switching control signal of the first switching leg is set to T1, and a phase difference between a switching control signal of the common switching leg and a switching control signal of the second switching leg is set to T2, any one of the phase difference T1 and the phase difference T2 is controlled to be zero in a case where a current flowing in the output terminal is smaller than a predetermined current value.

2. The power converter according to claim 1, wherein when the current flowing in the output terminal is larger than the predetermined current value, both the phase difference T1 and the phase difference T2 are controlled not to be zero.

3. The power converter according to claim 2, wherein when the current flowing in the output terminal is larger than the predetermined current value, the phase difference T1 and the phase difference T2 are controlled such that a current flowing in the first secondary circuit and a current flowing in the second secondary circuit are equal to each other.

4. The power converter according to claim 1, wherein a turn ratio of the first transformer is equal to a turn ratio of the second transformer.

5. The power converter according to claim 1, further comprising
a temperature detector that detects each temperature of the first transformer and the second transformer,
wherein the phase difference T1 is controlled to be zero when the current flowing in the output terminal is smaller than the predetermined current value and the temperature of the first transformer is higher than the temperature of the second transformer, and
the phase difference T2 is controlled to be zero when the current flowing in the output terminal is smaller than the predetermined current value and the temperature of the second transformer is higher than the temperature of the first transformer.

6. The power converter according to claim 1, wherein when a total of a current flowing in the first secondary circuit and a current flowing in the second secondary circuit is larger than the predetermined current value, the phase difference T1 is controlled based on the current flowing in the first secondary circuit, and the phase difference T2 is controlled based on the current flowing in the second secondary circuit.

7. A power converter comprising:
a common switching leg that is connected to one end of a primary side of a first transformer and is connected to one end of a second transformer;
a first switching leg that is connected to another end of the primary side of the first transformer;
a second switching leg that is connected to another end of a primary side of the second transformer;
a first secondary circuit that is connected to a secondary side of the first transformer; and
a second secondary circuit that is connected to a secondary side of the second transformer, wherein
the common switching leg, the first switching leg, and the second switching leg are electrically connected, in parallel, to an input terminal,
the first secondary circuit and the second secondary circuit are electrically connected, in parallel, to an output terminal, and
when open circuit failure occurs in the common switching leg, a phase difference between a switching control signal of the first switching leg and a switching control signal of the second switching leg is controlled based on currents flowing in the first secondary circuit and the second secondary circuit.

8. A power converter comprising:
a common switching leg that is connected to one end of a primary side of a first transformer and is connected to one end of a second transformer;
a first switching leg that is connected to another end of the primary side of the first transformer;
a second switching leg that is connected to another end of a primary side of the second transformer;
a first secondary circuit that is connected to a secondary side of the first transformer; and
a second secondary circuit that is connected to a secondary side of the second transformer, wherein
the common switching leg, the first switching leg, and the second switching leg are electrically connected, in parallel, to an input terminal,
the first secondary circuit and the second secondary circuit are electrically connected, in parallel, to an output terminal, and
when open circuit failure occurs in the first switching leg, a phase difference T2 between a switching control signal of the common switching leg and a switching control signal of the second switching leg is controlled based on a current flowing in the second secondary circuit.

9. A power converter comprising:
a common switching leg that is connected to one end of a primary side of a first transformer and is connected to one end of a second transformer;
a first switching leg that is connected to another end of the primary side of the first transformer;
a second switching leg that is connected to another end of a primary side of the second transformer;
a first secondary circuit that is connected to a secondary side of the first transformer; and a second secondary circuit that is connected to a secondary side of the second transformer, wherein
   the common switching leg, the first switching leg, and the second switching leg are electrically connected, in parallel, to an input terminal,
   the first secondary circuit and the second secondary circuit are electrically connected, in parallel, to an output terminal, and
   when open circuit failure occurs in the second switching leg, a phase difference T1 between a switching control signal of the common switching leg and a switching control signal of the first switching leg is controlled based on a current flowing in the first secondary circuit.

10. A power converter comprising:
a common switching leg that is connected to one end of a primary side of a first transformer and is connected to one end of a second transformer;
a first switching leg that is connected to another end of the primary side of the first transformer;
a second switching leg that is connected to another end of a primary side of the second transformer;
a first secondary circuit that is connected to a secondary side of the first transformer; and
a second secondary circuit that is connected to a secondary side of the second transformer, wherein
   the common switching leg, the first switching lea, and the second switching leg are electrically connected, in parallel, to an input terminal,
   the first secondary circuit and the second secondary circuit are electrically connected, in parallel, to an output terminal, and
   when a phase difference between a switching control signal of the common switching leg and a switching control signal of the first switching leg is set to T1, and a phase difference between a switching control signal of the common switching leg and a switching control signal of the second switching leg is set to T2, control is performed such that any one of the first secondary circuit and the second secondary circuit is stopped and any one of the phase difference T1 and the phase difference T2 is zero in a case where a current flowing in the input terminal is smaller than a predetermined current value.

\* \* \* \* \*